United States Patent
Park

(10) Patent No.: US 10,120,361 B2
(45) Date of Patent: Nov. 6, 2018

(54) MOTOR DRIVING APPARATUS, HOME APPLIANCE INCLUDING THE SAME, AND MOBILE TERMINAL

(71) Applicant: LG ELECTRONICS INC., Seoul (KR)

(72) Inventor: Cheonsu Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 245 days.

(21) Appl. No.: 15/261,014

(22) Filed: Sep. 9, 2016

(65) Prior Publication Data
US 2017/0068233 A1    Mar. 9, 2017

(30) Foreign Application Priority Data

Sep. 9, 2015 (KR) .................. 10-2015-0127823

(51) Int. Cl.
  G05B 9/02       (2006.01)
  G05B 19/042    (2006.01)
  H02P 27/08     (2006.01)
  H02P 6/14      (2016.01)
  H02P 31/00     (2006.01)

(52) U.S. Cl.
  CPC ............ *G05B 19/0428* (2013.01); *H02P 6/14* (2013.01); *H02P 27/08* (2013.01); *H02P 31/00* (2013.01); *G05B 2219/24024* (2013.01); *H02P 2209/13* (2013.01)

(58) Field of Classification Search
None
See application file for complete search history.

(56) References Cited

U.S. PATENT DOCUMENTS

| 5,987,105 A | 11/1999 | Jenkins et al. | |
| 6,222,301 B1* | 4/2001 | Sakai | H02N 2/14 310/316.01 |
| 2003/0067278 A1* | 4/2003 | Nakamura | H02P 27/08 318/400.04 |
| 2011/0062908 A1* | 3/2011 | Kitanaka | H02P 27/08 318/400.22 |

(Continued)

FOREIGN PATENT DOCUMENTS

| DE | 102013215846 A1 | 2/2015 |
| EP | 1067669 A2 | 1/2001 |

(Continued)

*Primary Examiner* — Adam Lee
(74) *Attorney, Agent, or Firm* — Dentons US LLP

(57) ABSTRACT

A motor driving apparatus including an inverter having a plurality of switching devices, wherein the inverter converts a direct current (DC) power into an alternating current (AC) power according to switching of the switching devices and supplies the AC power to a motor, and a controller to control the inverter, wherein the controller performs a control operation such that a switching frequency of the respective switching devices of the inverter remains constant in a first mode corresponding to a motor operation mode and performs a control operation to change the switching frequency of the respective switching devices of the inverter in a second mode corresponding to a sound output mode for fault diagnosis to output sound corresponding to the changed switching frequency.

14 Claims, 20 Drawing Sheets

(56) References Cited

U.S. PATENT DOCUMENTS

| | | | |
|---|---|---|---|
| 2011/0062913 A1* | 3/2011 | Lin | H02J 7/0055 320/101 |
| 2012/0169263 A1* | 7/2012 | Gallegos-Lopez | H02P 25/22 318/400.29 |
| 2013/0060359 A1* | 3/2013 | Kim | H04L 43/50 700/90 |
| 2013/0066593 A1* | 3/2013 | Kim | H04L 12/2836 702/185 |
| 2014/0006953 A1* | 1/2014 | Kim | H04L 12/282 715/727 |
| 2014/0009300 A1* | 1/2014 | Ha | G05B 23/0205 340/679 |
| 2014/0103854 A1* | 4/2014 | Bae | B60L 11/1803 318/721 |
| 2014/0153757 A1* | 6/2014 | Ku | H04R 25/505 381/317 |
| 2016/0248354 A1* | 8/2016 | Liu | H02P 6/18 |
| 2016/0267775 A1* | 9/2016 | Berezowski | G08B 29/02 |

FOREIGN PATENT DOCUMENTS

| | | |
|---|---|---|
| JP | 2001-025258 | 1/2001 |
| KR | 10-2011-0010374 | 2/2011 |
| KR | 10-2011-0083916 | 7/2011 |

\* cited by examiner

MOTOR DRIVING APPARATUS, HOME APPLIANCE INCLUDING THE SAME, AND MOBILE TERMINAL

CROSS-REFERENCE TO RELATED APPLICATION

This application claims priority to Korean Patent Application No. 10-2015-0127823, filed on Sep. 9, 2015 in the Korean Intellectual Property Office, the disclosure of which is incorporated herein by reference.

BACKGROUND

1. Field

The Present Disclosure Relates to a Motor Driving apparatus, a home appliance including the same, and a mobile terminal, and more particularly, to a motor driving apparatus capable of outputting sound related to fault diagnosis using a motor, a home appliance including the same, and a mobile terminal.

2. Description of the Related Art

A motor driving apparatus is an apparatus configured to drive a motor including a rotor for rotational movement and a stator on which a coil is wound.

Motor driving apparatuses may be divided into sensor type motor driving apparatuses, which employ a sensor, and sensorless motor driving apparatuses.

Recently, sensorless motor driving apparatuses have been widely used for reasons such as reduction of manufacturing costs. Research has been conducted on sensorless motor driving apparatuses to ensure efficient motor driving.

SUMMARY

Therefore, the present disclosure has been made in view of the above problems, and it is an object of the present disclosure to provide a motor driving apparatus capable of easily outputting sound related to fault diagnosis using a motor, a home appliance including the same, and a mobile terminal.

In accordance with an aspect of the present disclosure, the above and other objects can be accomplished by the provision of a motor driving apparatus including an inverter having a plurality of switching devices, the inverter being configured to convert a direct current (DC) power into an alternating current (AC) power according to switching of the switching devices and to supply the AC power to a motor, and a controller to control the inverter, wherein the controller is configured to perform a control operation such that a switching frequency of the respective switching devices of the inverter remains constant in a first mode corresponding to a motor operation mode and to perform a control operation to change the switching frequency of the respective switching devices of the inverter in a second mode corresponding to a sound output mode for fault diagnosis to output sound corresponding to the changed switching frequency.

In accordance with another aspect of the present invention, there is provided a motor driving apparatus including a memory, a communication unit to receive data from a mobile terminal, an inverter having a plurality of switching devices, the inverter being configured to convert a direct current (DC) power into an alternating current (AC) power according to switching of the switching devices and to supply the AC power to a motor, and a controller to control the inverter, wherein, when a diagnostic data request is received from the mobile terminal, the controller changes a switching frequency of the respective switching devices of the inverter such that sound corresponding to diagnostic data stored in the memory is output.

In accordance with a further aspect of the present invention, there is provided a home appliance including a motor, an inverter having a plurality of switching devices, the inverter being configured to convert a direct current (DC) power into an alternating current (AC) power according to switching of the switching devices and to supply the AC power to a motor, and a controller to control the inverter, wherein the controller is configured to perform a control operation such that a switching frequency of the respective switching devices of the inverter remains constant in a first mode and to perform a control operation to change the switching frequency of the respective switching devices of the inverter in a second mode to output sound corresponding to the changed switching frequency, wherein the second mode is a sound output mode for fault diagnosis.

In accordance with yet another aspect of the present invention, there is provided a mobile terminal including a display, a microphone to receive sound from home appliances, a communication unit to exchange data with a server, a controller to transmit, when a diagnostics item is selected with a device diagnosis window displayed, a request for diagnostic data to a corresponding home appliance, to extract, when sound is received from the home appliance through the microphone in response to the request for diagnostic data, the diagnostic data from the received sound, and to transmit the extracted diagnostic data to the server.

BRIEF DESCRIPTION OF THE DRAWINGS

The above and other objects, features, and other advantages of embodiments of the present invention will be more clearly understood from the following detailed description taken in conjunction with the accompanying drawings, in which.

DETAILED DESCRIPTION

Reference will now be made in detail to the preferred embodiments of the present invention, examples of which are illustrated in the accompanying drawings. Wherever possible, the same reference numbers will be used throughout the drawings to refer to the same or like parts.

As used herein, the suffixes "module" and "unit" are added or used interchangeably to facilitate preparation of this specification and are not intended to suggest distinct meanings or functions. Accordingly, the terms "module" and "unit" may be used interchangeably.

Figure 1:
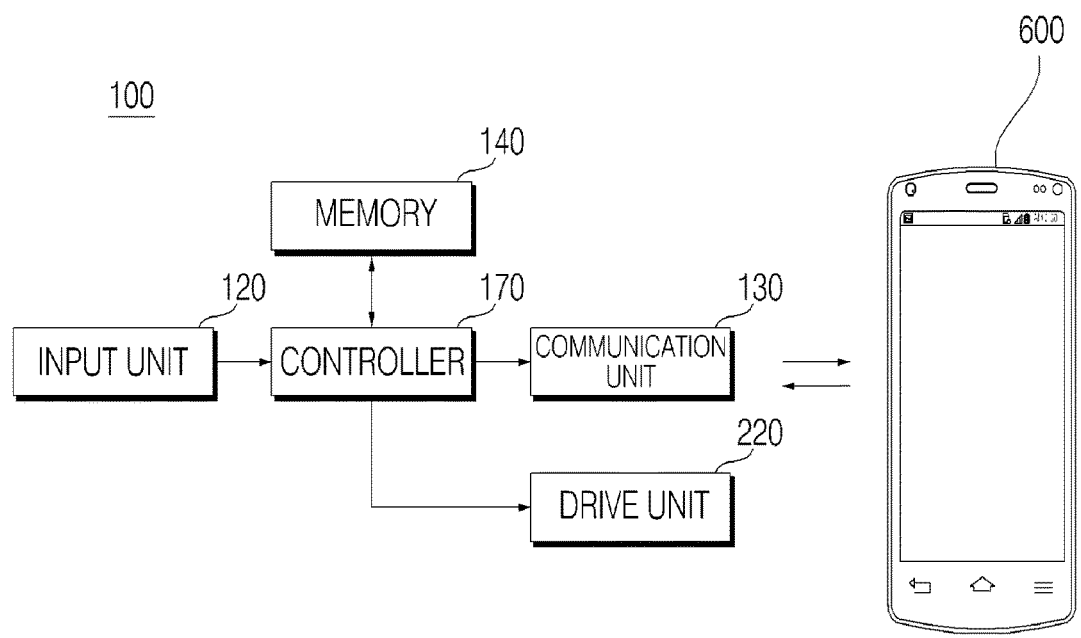
FIG. 1 is an internal block diagram illustrating a home appliance according to an embodiment of the present invention.

A home appliance 100 according to one embodiment of the present invention may correspond to a laundry treating appliance, an air conditioner, a refrigerator, a water purifier, a cleaner, a vehicle, a robot, and a drone FIG. 1 is an internal block diagram illustrating a home appliance according to an embodiment of the present invention.

Home appliance 100 may include an input unit 120, a communication unit 130, a memory 140, a controller 170, and a drive unit 220.

Input unit 120 may include a manipulation button and a key, and output an input signal for power on/off and operation setting of home appliance 100.

Communication unit 130 may exchange data with a peripheral device, for example, a remote controller or a mobile terminal 600 by wire or wirelessly. For example, communication unit 113 may perform infrared (IR) communication, radio frequency (RF) communication, Bluetooth communication, ZigBee communication, Wi-Fi communication, and the like.

Memory 140 may store data necessary for operation of electronic device 100. For example, memory 140 may store data such as the operation time and operation mode of drive unit 220.

Controller 170 may control individual units in home appliance 100. For example, controller 170 may control input unit 120, communication unit 130, memory 140, and drive unit 220.

Regarding this embodiment, controller 170 may control the respective switching devices of an inverter 420 to operate at a constant switching frequency in a first mode which is the operation mode of motor 230, and perform a control operation to change the switching frequency of the respective switching devices of inverter 420 to output sound corresponding to the changed switching frequency.

When an error occurs in the first mode, controller 170 may perform a control operation to store, in a memory 270, at least one of operation information and error information about motor 230 produced when the error occurs, to enter a second mode according to occurrence of the error, and to output sound corresponding to at least one of the operation information and error information about motor 230 stored in memory 270.

Controller 170 may perform a control operation to implement the second mode within a predetermined time or prior to the alignment period of motor 230 after controller 170 is turned on.

When controller 170 receives a diagnostics data request from mobile terminal 600 through communication unit 130, controller 170 may perform a control operation to enter the second mode and to output sound corresponding to the diagnostics data stored in memory 270.

Controller 170 may perform a control operation to change the volume, frequency, or output period of sound according to the distance to mobile terminal 600 or the intensity of the signal for the diagnostics data request received from mobile terminal 600.

Controller 170 may perform a control operation to change the turn-on duty of a switching control signal for driving the respective switching devices in inverter 420, such that the volume of sound is changed.

Controller 170 may perform a control operation to change the level or frequency of a current flowing through motor 230, such that the volume or frequency of sound is changed.

In the second mode, controller 170 may perform a control operation to output sound containing diagnostic data.

Controller 170 may include a frequency transformer to transform the frequency of sound to be output, a data insertion unit to insert the diagnostic data into a frequency-transformed audio signal, an inverse transformer to inversely transform the audio signal containing the diagnostic data, and a multiplexer to multiplex the inversely transformed audio signal. In addition, controller 170 may change the switching frequency of the respective switching devices of inverter 420 based on the multiplexed audio signal.

When an input for executing the first mode is received in the second mode, controller 170 may determine whether to stop an operation in the second mode, based on a time for completion of the operation in the second mode. If the operation completion time is not later than a predetermined time, controller 170 may perform a control operation to maintain the second mode.

Drive unit 220 may drive the motor of home appliance 100.

A motor driving apparatus described in this specification is an apparatus which is not provided with a position sensor such as a Hall sensor for sensing the position of the rotor of the motor, but is capable of estimating the position of the rotor of the motor in a sensorless manner. Hereinafter, a sensorless motor driving apparatus will be described.

A motor drive unit 220 according to one embodiment of the present invention may be referred to as a motor driving apparatus 220.

Figure 2:
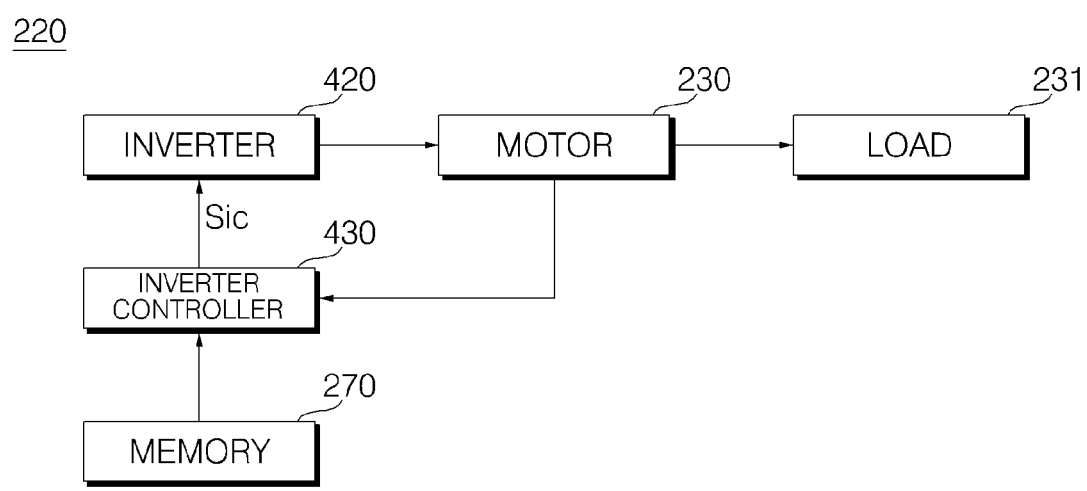
FIG. 2 is an internal block diagram illustrating the motor driving apparatus of FIG. 1.
Figure 3:
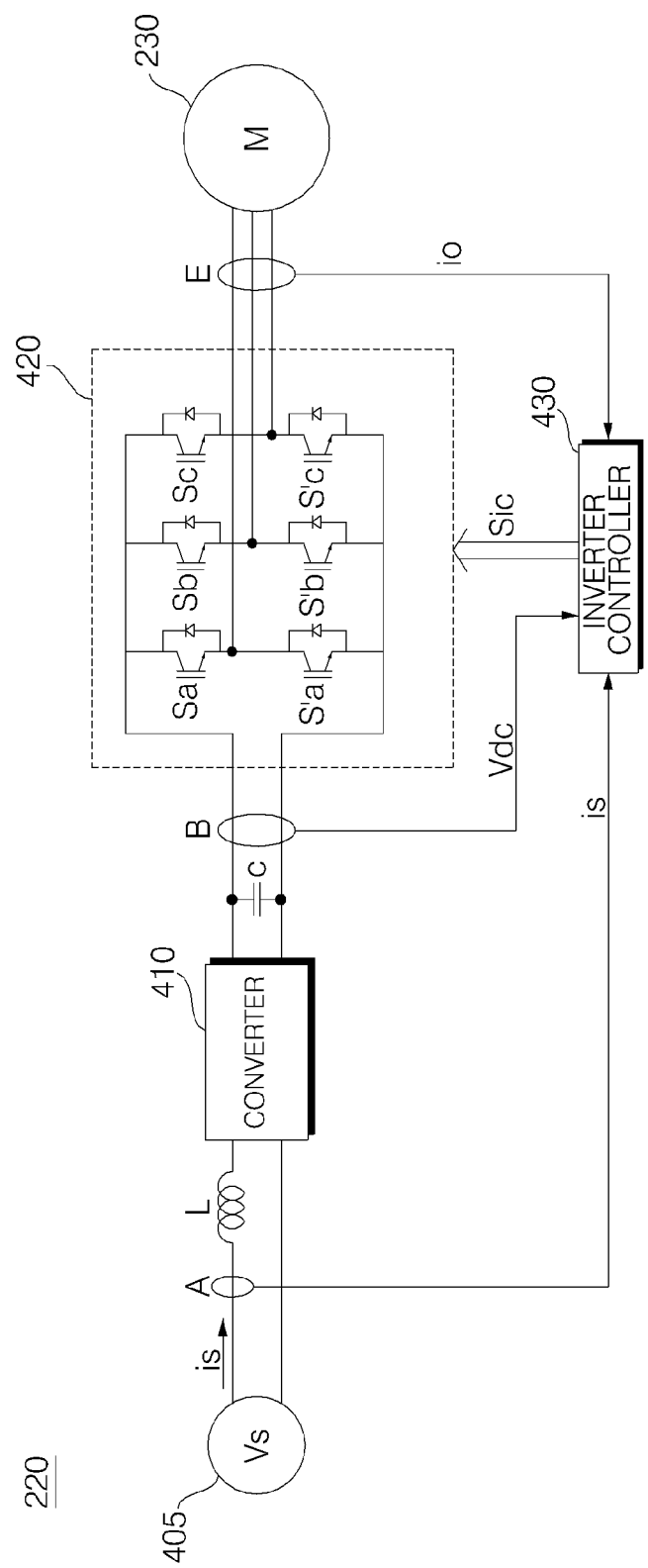
FIG. 3 is an internal circuit diagram illustrating the motor driving apparatus of FIG. 2.

FIG. 2 is an internal block diagram illustrating the motor driving apparatus of FIG. 1, and FIG. 3 is an internal circuit diagram illustrating the motor driving apparatus of FIG. 2.

Referring to FIGS. 1 and 2, motor driving apparatus 220, which is configured to drive a motor in a sensorless manner, may include an inverter 420 and an inverter controller 430.

Motor driving apparatus 220 may further include a converter 410, a DC link voltage detector B, a smoothing capacitor C, and an output current detector E. Drive unit 220 may further include an input current detector A and a reactor L.

According to an embodiment of the present invention, inverter controller 430 may control the respective switching devices of inverter 420 to operate at a constant switching frequency in a first mode which is the operation mode of motor 230, and perform a control operation to change the switching frequency of the respective switching devices of inverter 420 in a second mode, which is a sound output mode for fault diagnosis, to output sound corresponding to the changed switching frequency.

When an error occurs in the first mode, inverter controller 430 may perform a control operation to store, in memory 270, at least one of operation information and error information about motor 230 produced when the error occurs, to enter a second mode according to occurrence of the error, and to output sound corresponding to at least one of the operation information and error information about motor 230 stored in memory 270.

Inverter controller 430 may perform a control operation to implement the second mode within a predetermined time or prior to the alignment period of motor 230 after inverter controller 430 is turned on.

When inverter controller 430 receives a diagnostic data request from mobile terminal 600 through communication unit 130, inverter controller 430 may perform a control operation to enter the second mode and to output sound corresponding to the diagnostic data stored in memory 270.

Inverter controller 430 may perform a control operation to change the volume, frequency, or output period of sound according to the distance to mobile terminal 600 or the intensity of the signal for the diagnostic data request received from mobile terminal 600.

Inverter controller 430 may perform a control operation to change the turn-on duty of a switching control signal for driving the respective switching devices in inverter 420, such that the volume of sound is changed.

Inverter controller 430 may perform a control operation to change the level or frequency of a current flowing through motor 230, such that the volume or frequency of sound is changed.

In the second mode, inverter controller 430 may perform a control operation to output sound containing diagnostic data.

Inverter controller 430 may include a frequency transformer to transform the frequency of output sound, a data insertion unit to insert diagnostic data into a frequency-transformed audio signal, an inverse transformer to inversely transform the audio signal containing diagnostic data, and a multiplexer to multiplex the inversely transformed audio signal. In addition, inverter controller 430 may change the switching frequency of the respective switching devices of inverter 420 based on the multiplexed audio signal.

When an input for executing the first mode is received in the second mode, inverter controller 430 may determine whether to stop the operation in the second mode based on the time for completion of operation in the second mode. If the operation completion time is not later than a predetermined time, inverter controller 430 may perform a control operation to maintain the second mode.

Hereinafter, operations of respective constituent units in motor driving apparatus 220 of FIGS. 2 and 3 will be described.

Reactor L is disposed between a commercial AC power source 405 ($v_s$) and converter 410 to perform power factor correction or voltage boost. Reactor L may also function to restrict harmonic current according to high-speed switching of converter 410.

Input current detector A may detect input current $i_s$ that is input from the commercial AC power source 405. To this end, a current transformer (CT) or a shunt resistor may be used as the input current detector A. The detected input current $i_s$, which is a discrete signal in the form of a pulse, may be input to inverter controller 430.

Converter 410 converts commercial AC power 405 applied via reactor L into DC power and output the DC power. While commercial AC power 405 is illustrated as single-phase AC power, 3-phase AC power may be used as commercial AC power 405. The internal structure of converter 410 depends on the type of commercial AC power source 405.

Converter 410 may be configured by diodes without the switching device. In this case, converter 410 may perform the rectification operation without performing a separate switching operation.

For example, when the applied power is single-phase AC power, 4 diodes may be used in the form of a bridge. When the applied power is 3-phase AC power, 6 diodes may be used in the form of a bridge.

As converter 410, a half-bridge converter formed by connecting, for example, 2 switching devices and 4 diodes may be used. When 3-phase AC power is used, 6 switching devices and six diodes may be used.

When converter 410 is provided with switching devices, converter 410 may perform voltage boost, power factor improvement, and DC power conversion according to the switching operation of the switching devices.

Smoothing capacitor C smooths and stores input power. While the figure illustrates that one smoothing capacitor C is used, a plurality of smoothing capacitors may be provided to secure device stability.

While smoothing capacitor C is illustrated as being connected to the output terminal of converter 410, embodiments of the present invention are not limited thereto. DC power may be directly applied to smoothing capacitor C. For example, DC power from a solar cell may be directly input to smoothing capacitor C or input to smoothing capacitor C via DC-DC conversion. Hereinafter, description will be given based on details illustrated in the figures.

As DC power is stored in smoothing capacitor C, both ends of smoothing capacitor C may be referred to as DC ends or DC link ends.

DC link voltage detector B may detect a DC link voltage Vdc between both ends of smoothing capacitor C. To this end, DC link voltage detector B may include a resistor device and an amplifier. The detected DC link voltage Vdc may be input to inverter controller 430 as a discrete signal in the form of a pulse.

Inverter 420 may be provided with a plurality of inverter switching devices. Thereby, inverter 420 may convert the rectified DC power Vdc into 3-phase AC powers va, vb, and vc of predetermined frequencies according to turning on/off of the switching devices and output the converted powers to a 3-phase synchronous motor 230.

Inverter 420 includes upper switching devices Sa, Sb, and Sc and lower switching devices S'a, S'b, and S'c. Each of the upper switching devices Sa, Sb, Sc and a corresponding lower switching device S'a, S'b, S'c are connected in series to form a pair. Three pairs of upper and lower switching devices Sa and S'a, Sb and S'b, and Sc and S'c are connected in parallel. Each of the switching devices Sa, S'a, Sb, S'b, Sc, and S'c is connected with a diode in an antiparallel manner.

Each of the switching devices in inverter 420 is turned on/off based on an inverter switching control signal Sic from inverter controller 430. Thereby, 3-phase AC power having a predetermined frequency is output to the 3-phase synchronous motor 230.

Inverter controller 430 may control the switching operation of inverter 420 in a sensorless manner. To this end, inverter controller 430 may receive an output current $i_o$ detected by output current detector E.

In order to control the switching operation of inverter 420, inverter controller 430 outputs the inverter switching control signal Sic to inverter 420. The inverter switching control signal Sic is a pulse width modulated (PWM) switching control signal. The inverter switching control signal Sic is generated and output based on the output current $i_o$ detected by output current detector E. The operation of outputting the inverter switching control signal Sic from inverter controller 430 will be described in detail with reference to FIG. 3 later in this specification.

Output current detector E detects output current $i_o$ flowing between inverter 420 and the 3-phase motor 230. That is, output current detector E detects current flowing to motor 230. Output current detector E may detect all output currents ia, ib, and is of the respective phases, or detect output currents of two phases using 3-phase smoothing.

Output current detector E may be positioned between inverter 420 and motor 230, and may employ a current transformer (CT), a shunt resistor, or the like to detect currents.

In using shunt resistors, three shunt resistors may be positioned between inverter 420 and synchronous motor 230, or ends of the shunt resistors may be connected to the three lower switching devices S'a, S'b, and S'c of inverter 420. It is also possible to use two shunt resistors based on 3-phase smoothing. When a single shunt resistor is employed, the shunt resistor may be disposed between capacitor C and inverter 420.

The detected output current $i_o$ may be a discrete signal in form of a pulse and may be applied to inverter controller 430. The inverter switching control signal Sic is generated based on the detected output current $i_o$. In the following description, the output current $i_o$ may be illustrated as including 3-phase output currents ia, ib, and ic.

The 3-phase motor 230 includes a stator and a rotor. The rotor rotates when AC current of a phase of a predetermined frequency is applied to a coil of a corresponding phase (of a, b, and c phases) of the stator.

Motor 230 may include, for example, a Surface-Mounted Permanent-Magnet Synchronous Motor (SMPMSM), an Interior Permanent Magnet Synchronous Motor (IPMSM), and a Synchronous Reluctance Motor (SynRM). The SMPMSM and the IPMSM are Permanent Magnet Synchronous Motors (PMSM) employing permanent magnets, while the SynRM does not have a permanent magnet.

Figure 4:
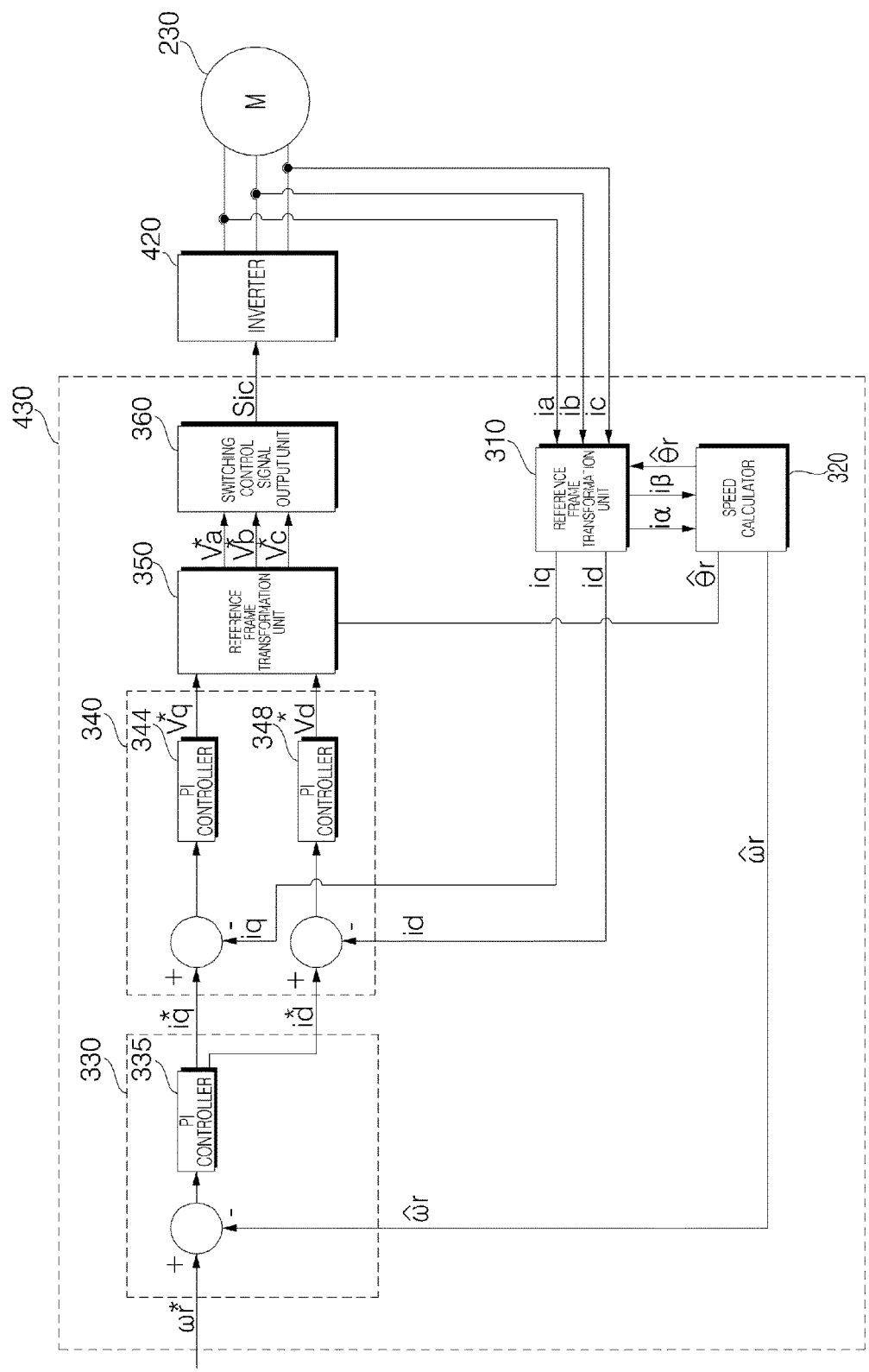
FIG. 4 is an internal block diagram illustrating the inverter controller of FIG. 3.

FIG. 4 is an internal block diagram illustrating an inverter controller of FIG. 3.

Referring to FIG. 4, inverter controller 430 may include a reference frame transformation unit 310, a speed calculator 320, a current command generator 330, a voltage command generator 340, a reference frame transformation unit 350, and a switching control signal output unit 360.

Reference frame transformation unit 310 receives the 3-phase output currents (ia, ib, ic) detected by output current detector E, and transforms the same into 2-phase currents (iα, iβ) in a stationary reference frame.

Reference frame transformation unit 310 may transform 2-phase currents (iα, iβ) in the stationary reference frame into 2-phase currents (id, iq) in a rotating reference frame.

Speed calculator 320 may output a position $\hat{\theta}_r$ and a speed $\hat{\omega}_r$ calculated based on the 2-phase currents (iα, iβ) of the stationary reference frame that are frame-transformed by reference frame transformation unit 310.

Current command generator 330 generates a current command value $i^*_q$ based on the calculated speed $\hat{\omega}_r$ and a speed command value $\omega^*_r$. For example, current command generator 330 may perform PI control in a PI controller 335 and generate the current command value $i^*_q$ based on the difference between the calculated speed $\hat{\omega}_r$ and the speed command value $\omega^*_r$. While FIG. 3 illustrates a q-axis current command value $i^*_q$ as a current command value, a d-axis current command value $i^*_d$ may also be generated. The d-axis current command value $i^*_d$ may be set to 0.

Current command generator 330 may further include a limiter (not shown) for limiting the level of the current command value $i^*_q$ such that the current command value $i^*_q$ does not exceed an allowable range.

Next, voltage command generator 340 generates d-axis and q-axis voltage command values $v^*_d$ and $v^*_q$ based on the d-axis and q-axis currents $i_d$ and $i_q$ which are transformed into currents in the 2-phase rotating reference frame by the reference frame transformation unit and the current command values $i^*_d$ and $i^*_q$ from current command generator 330. For example, voltage command generator 340 may perform PI control in a PI controller 344 and generate a q-axis voltage command value $v^*_q$ based on the difference between the q-axis current $i_q$ and the q-axis current command value $i^*_q$. Additionally, voltage command generator 340 may perform PI control in a PI controller 348 and generate the d-axis voltage command value $v^*_d$ based on the difference between the d-axis current id and the d-axis current command value $i^*_d$. Voltage command generator 340 may further include a limiter (not shown) for limiting the levels of the d-axis and q-axis voltage command values $v^*_d$ and $v^*_q$ such that the d-axis and q-axis voltage command values $v^*_d$ and $v^*_q$ do not exceed an allowable range.

The generated d-axis and q-axis voltage command values $V^*_d$ and $v^*_q$ are input to reference frame transformation unit 350.

Reference frame transformation unit 350 receives the position $\hat{\theta}_r$ calculated by speed calculator 320 and the d-axis and q-axis voltage command values $v^*_d$ and $v^*_q$ and performs reference frame transformation.

Reference frame transformation unit 350 transforms a 2-phase rotating reference frame into a 2-phase stationary reference frame. The transformation may be performed using the position $\hat{\theta}_r$ calculated by speed calculator 320.

Reference frame transformation unit 350 may also transform the 2-phase stationary reference frame into a 3-phase stationary reference frame. Through such transformation, reference frame transformation unit 350 outputs 3-phase output voltage command values $v^*_a$, $v^*_b$, and $v^*_c$.

Switching control signal output unit 360 outputs a PWM inverter switching control signal Sic based on the 3-phase output voltage command values $v^*_a$, $v^*_b$, and $v^*_c$.

The output inverter switching control signal Sic is transformed into a gate drive signal in a gate drive unit (not shown) and then input to the gate of each switching device in inverter 420. Thereby, the switching devices Sa, S'a, Sb, S'b, Sc, and S'c in inverter 420 perform the switching operation.

Figure 5:
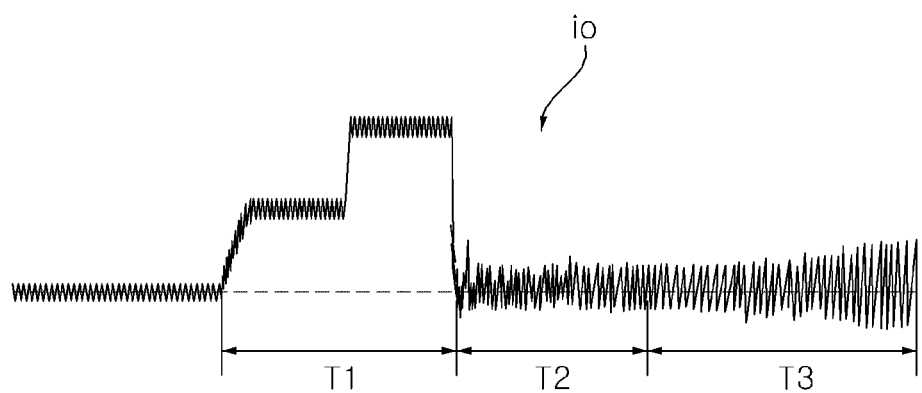
FIG. 5 illustrates an exemplary waveform of an output current applied to the motor of FIG. 2.

FIG. 5 illustrates an exemplary waveform of an output current applied to the motor of FIG. 2.

Referring to FIG. 5, motor 230 may be driven by dividing the operation thereof into a motor alignment section T1 for aligning the motor, an acceleration section T2 for accelerating the motor, and a normal operation section T3 for operating the motor by changing the speed thereof according to load.

The first mode described above may conceptually include the motor alignment section T1, acceleration section T2, and normal operation section T3.

The second mode may be implemented before motor alignment section T1.

For example, the second mode may be implemented within a predetermined time or prior to the alignment period of motor 230 after power is applied.

In the case where the home appliance is an air conditioner, when inverter controller 430 receives a temperature adjustment input through communication unit 130 after being turned on, inverter controller 430 may perform a control operation to implement the second mode before operation of motor 230, namely prior to motor alignment section T1.

Figure 6:
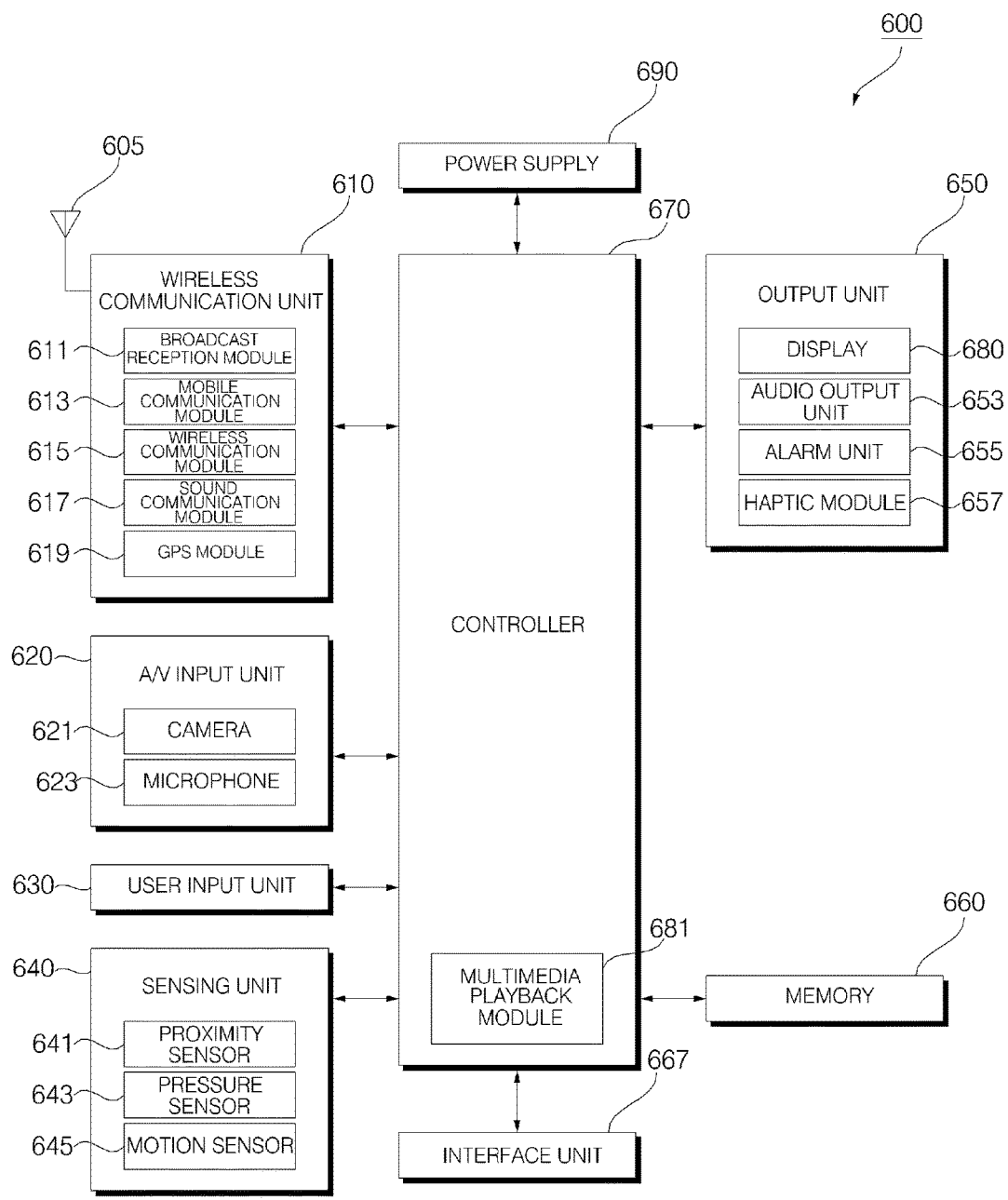
FIG. 6 is an internal block diagram illustrating the mobile terminal of FIG. 1.

FIG. 6 is an internal block diagram illustrating the mobile terminal of FIG. 1.

Referring to FIG. 6, mobile terminal 600 may include wireless communication unit 610, an A/V (Audio/Video) input unit 620, a user input unit 630, a sensing unit 640, an output unit 650, a memory 660, an interface unit 667, a controller 670, and a power supply 690.

Wireless communication unit 610 may include a broadcast reception module 611, a mobile communication module 613, a wireless Internet module 615, a sound communication unit 617, and a GPS module 619.

Broadcast reception module 611 may receive at least one of a broadcast signal and broadcast-related information from an external broadcast management server over a broadcast channel. The broadcast channel may include a satellite channel and a terrestrial channel.

The broadcast signal and/or the broadcast-related information received through the broadcast reception module 611 may be stored in memory 660.

Mobile communication module 613 transmits and receives a radio signal to and from at least one of a base station, an external terminal, and a server over a mobile communication network. Herein, the radio signal may contain various kinds of data according to transmission and reception of a voice call signal, a video call signal, or a text/multimedia message.

Wireless Internet module 615 refers to a module for wireless Internet access. Wireless Internet module 615 may be installed inside or outside mobile terminal 600. For example, wireless Internet module 615 may perform Wi-Fi-based wireless communication or Wi-Fi Direct-based wireless communication.

Sound communication unit 617 may perform sound communication. Sound communication unit 617 may output sound by adding predetermined information to audio data to be output in a sound communication mode. In addition, sound communication unit 617 may extract predetermined information from a received sound in the sound communication mode. Relevant details will be described with reference to FIGS. 11A to 11C.

Additionally, as short-range communication technology, Bluetooth, Radio Frequency Identification (RFID), Infrared Data Association (IrDA), Ultra Wideband (UWB), and Zig-Bee may be employed.

Global Position System (GPS) module 619 may receive position information from a plurality of GPS satellites.

A/V (Audio/Video) input unit 620, which is used to input an audio signal or a video signal, may include a camera 621 and a microphone 623.

User input unit 630 generates key input data which is input by the user to control operation of the terminal. To this end, user input unit 630 may be configured by a keypad, a dome switch, a touchpad (resistive touchpad/capacitive touchpad), and the like. Particularly, when a touchpad and a display 680 construct a layered structure, the structure may be referred to as a touchscreen.

Sensing unit 640 may sense present states of mobile terminal 600 such as the opened or closed state of mobile terminal 600, the location of mobile terminal 600 and presence of user contact, and generate a sensing signal for controlling operation of mobile terminal 600.

Sensing unit 640 may include a proximity sensor 641, a pressure sensor 643, and a motion sensor 645. Motion sensor 645 may sense movement or location of mobile terminal 600 using an acceleration sensor, a gyro sensor, a gravity sensor, and the like. Particularly, the gyro sensor, which serves to measure an angular speed, may sense the orientation (angle) with respect to a reference direction.

Output unit 650 may include display 680, an audio output unit 653, an alarm unit 655, and a haptic module 657.

Display 680 displays and outputs information processed by mobile terminal 600.

When display 680 and a touchpad construct a layered structure to form a touchscreen as described above, display 680 may be used not only as an output device but also as an input device through which information can be input according to user touch.

Audio output unit 653 outputs audio data received from wireless communication unit 610 or stored in memory 660. Audio output unit 653 may include a speaker and a buzzer.

Alarm unit 655 outputs a signal indicating occurrence of an event on mobile terminal 600. For example, the signal may be output in the form of vibration.

Haptic module 657 generates various haptic effects which can be felt by the user. A typical example of the haptic effects generated by haptic module 657 is vibration.

Memory 660 may store a program for processing and controlling operations of controller 670, or perform a function of temporarily storing data (e.g., a phonebook, a message, a still image, a moving image, etc.) which is input or output.

Interface unit 667 serves as an interface between mobile terminal 600 and all external devices connected thereto. Interface unit 667 may receive data from the external devices or applied power and deliver the same to internal constituents of mobile terminal 600. Interface unit 667 may also allow data in mobile terminal 600 to be transmitted to external devices.

Usually, controller 670 controls operation of each unit described above and also controls overall operations of mobile terminal 600. For example, controller 670 may perform relevant control and processing for a voice call, data communication and a video call. Controller 670 may include a multimedia reproduction module 681 for reproducing multimedia. Multimedia reproduction module 681 may be provided in controller 670 as hardware, or configured as software separate from controller 670.

External power or internal power is applied to power supply 690 under control of controller 670, and power supply 690 supplies power necessary for operations of the respective constituents.

The block diagram of mobile terminal 600 shown in FIG. 6 is a block diagram of an embodiment of the present invention. Each constituent in the block diagram may be integrated, added or omitted according to the specifications of mobile terminal 600 as realized. That is, two or more constituents may be combined to form one constituent, or one constituent may be divided into two or more constituents. In addition, functions performed by the respective blocks are simply illustrative, and the specific operations or devices thereof do not limit the scope of the present invention.

Figure 7:
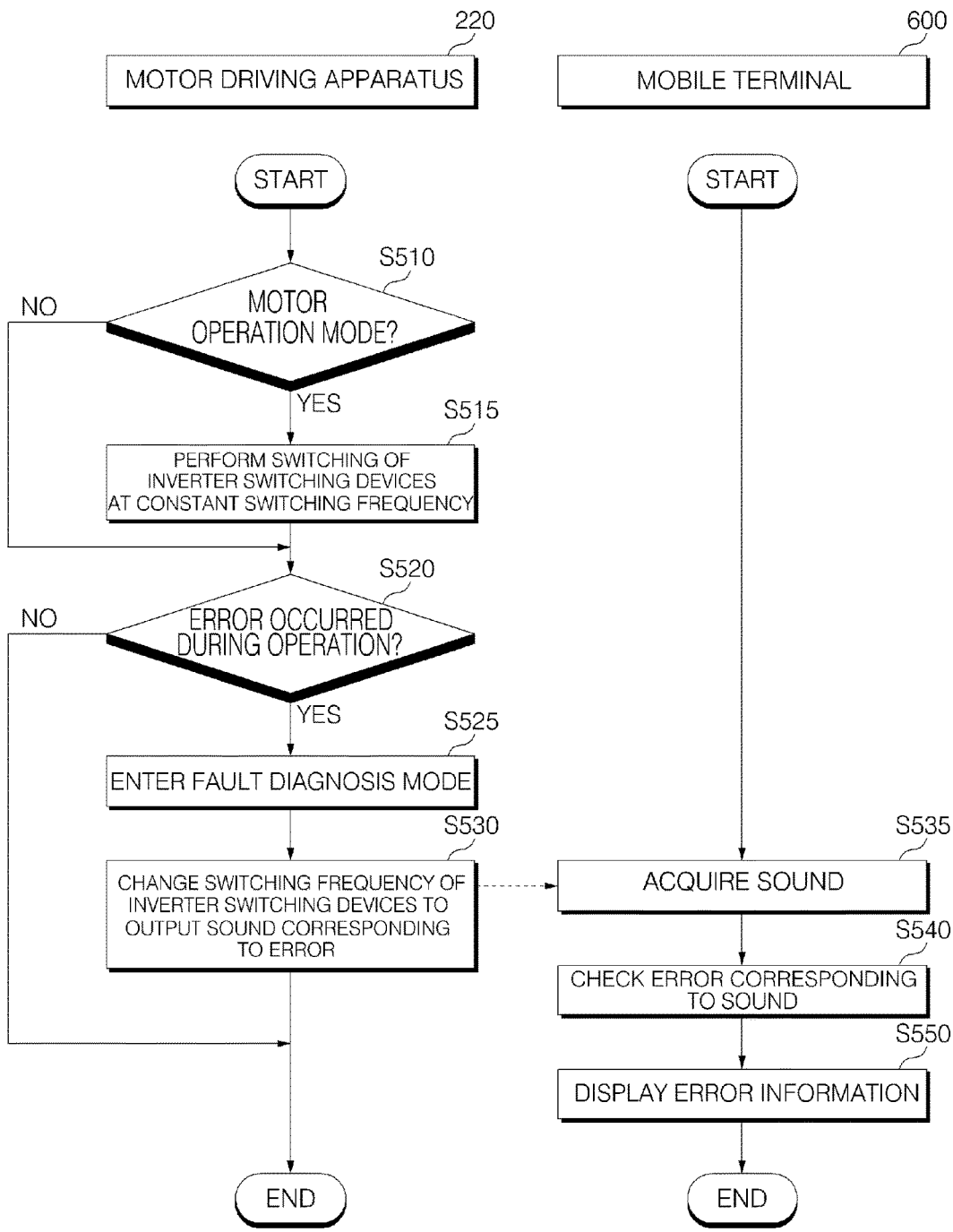
FIG. 7 is a flowchart illustrating operation of a motor driving apparatus according to an embodiment of the present invention.

FIG. 7 is a flowchart illustrating operation of a motor driving apparatus according to an embodiment of the present invention, and FIGS. 8A to 11 illustrate the operation of FIG. 7.

Referring to FIG. 7, inverter controller 430 of motor driving apparatus 220 determines whether the operation mode of motor 230 is a first mode (S510). If the operation mode is the first mode, inverter controller 430 controls the switching devices Sa, Sb, Sc, S'a, S'b, and S'c to operate at a constant switching frequency (S515).

Figure 8A:
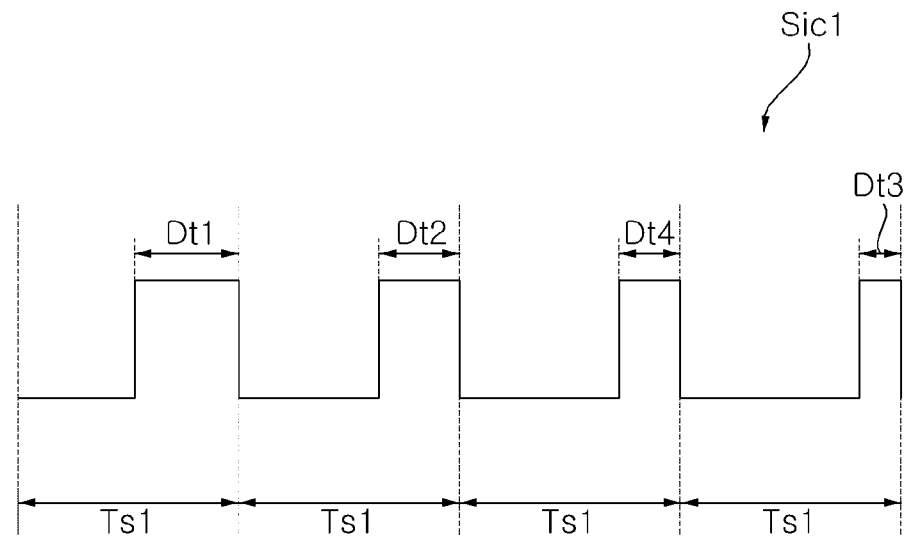
FIGS. 8A, 8B, 9A, 9B, 10A, 10B, 11A, 11B, AND 11C illustrate the operation of FIG. 7.

FIG. 8A depicts a Sic1 in the first mode.

Referring to FIG. 8A, a Sic 1 has a constant period Ts1, namely a constant frequency and different duties Dt1, Dt2, Dt3, and Dt4 in the respective periods in the first mode.

Thereby, the respective switching devices Sa, Sb, Sc, S'a, S'b, and S'c in inverter 420 perform switching at a constant switching frequency.

Next, inverter controller 430 of motor driving apparatus 220 determines whether an error occurs during operation in the first mode (S520).

If the error occurs during operation in the first mode, inverter controller 430 may perform a control operation to store, in memory 270, at least one of operation information and error information about motor 230 produced when the error occurs.

Inverter controller 430 also performs a control operation to enter a second mode, which is a sound output mode for fault diagnosis (S525).

Additionally, inverter controller 430 performs a control operation to change the switching frequency of the respective switching devices of inverter 420 to output sound corresponding to at least one of the operation information and error information about motor 230 stored in memory 270 (S530).

Figure 8B:
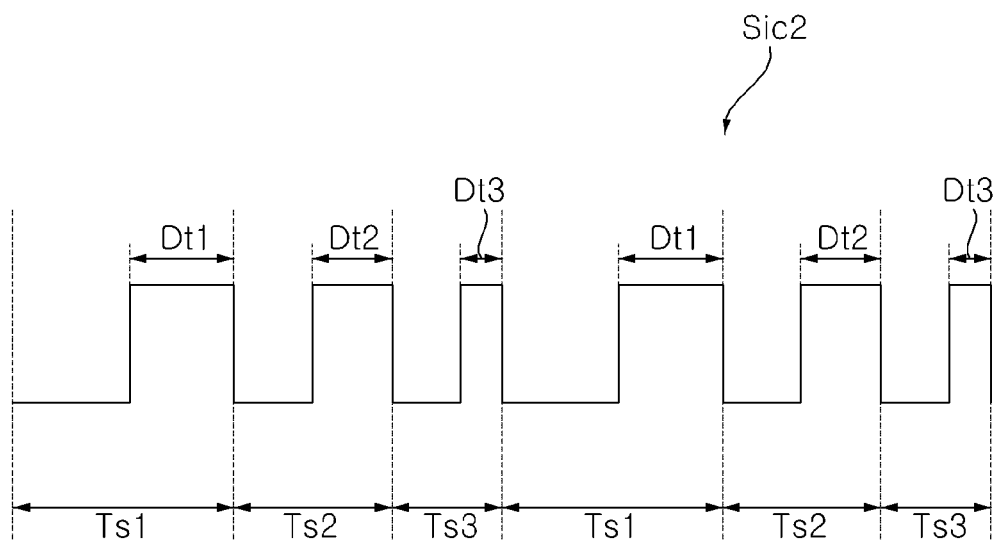

FIG. 8B depicts a second inverter switching control signal Sic2 in the second mode.

Referring to FIG. 8B, the periods Ts1, Ts2, Ts3, Ts4 of the second inverter switching control signal Sic2 change in the second mode, and different duties Dt1, Dt2, Dt3, and Dt4 are given to the respective periods.

Thereby, the respective switching devices Sa, Sb, Sc, S'a, S'b, and S'c in inverter 420 operate at a variable switching frequency, thereby outputting sound through motor 230.

Mobile terminal 600 positioned around motor driving apparatus 220 acquires sound from motor driving apparatus 220 through microphone 623 (S535).

Controller 670 of mobile terminal 600 extracts at least one of the operation information and error information from the sound, and checks the error information if the error information is provided (S540).

Next, controller 670 of mobile terminal 600 performs a control operation to display the error information through display 680 (S550).

Thereby, the error information about the home appliance may be easily checked through mobile terminal 600.

While the second mode may be implemented when an error occurs in home appliance 100 as described above, and embodiments of the present invention are not limited thereto. Different variations may be made to the embodiment.

For example, the second mode may be implemented according to a request from the remote controller of the home appliance or mobile terminal 600.

Specifically, when a driving information request or operation information request is received from the remote controller of home appliance 100 or mobile terminal 600, inverter controller 430 may transmit, via communication unit 130, the driving information or operation information about the home appliance stored in memory 140 or 270.

Alternatively, when a diagnostic data request is received from the remote controller of home appliance 100 or mobile terminal 600 via communication unit 130, inverter controller 430 may transmit the diagnostic data stored in memory 140 or 270.

Herein, the diagnostic data may conceptually include driving information, operation information and corresponding history data, and error information and corresponding history data.

Inverter controller 430 may perform a control operation to change the volume, frequency or output period of sound according to the distance to mobile terminal 600 or the intensity of the signal for the diagnostic data request received from mobile terminal 600.

Figure 9A:
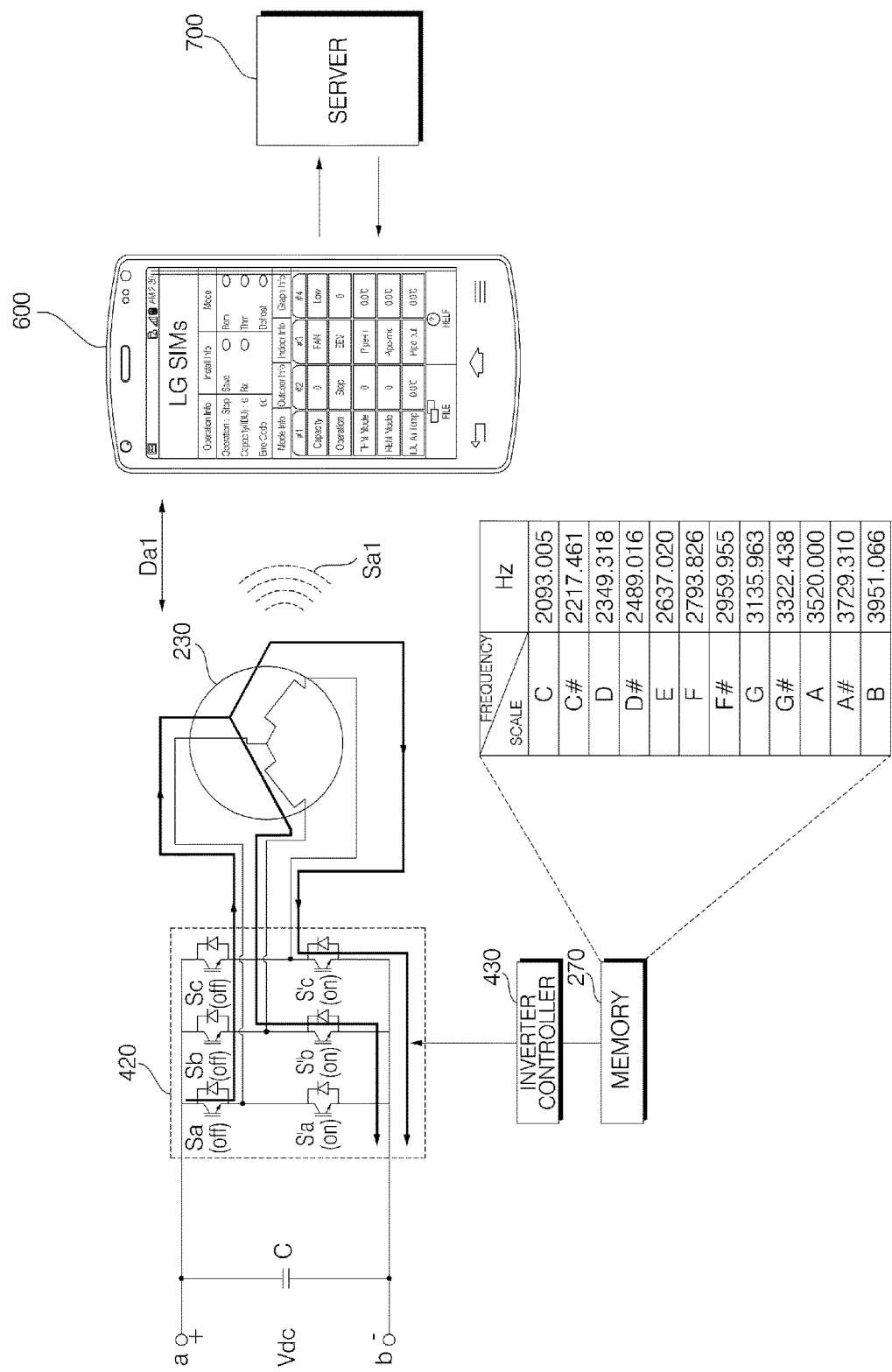
Figure 9B:
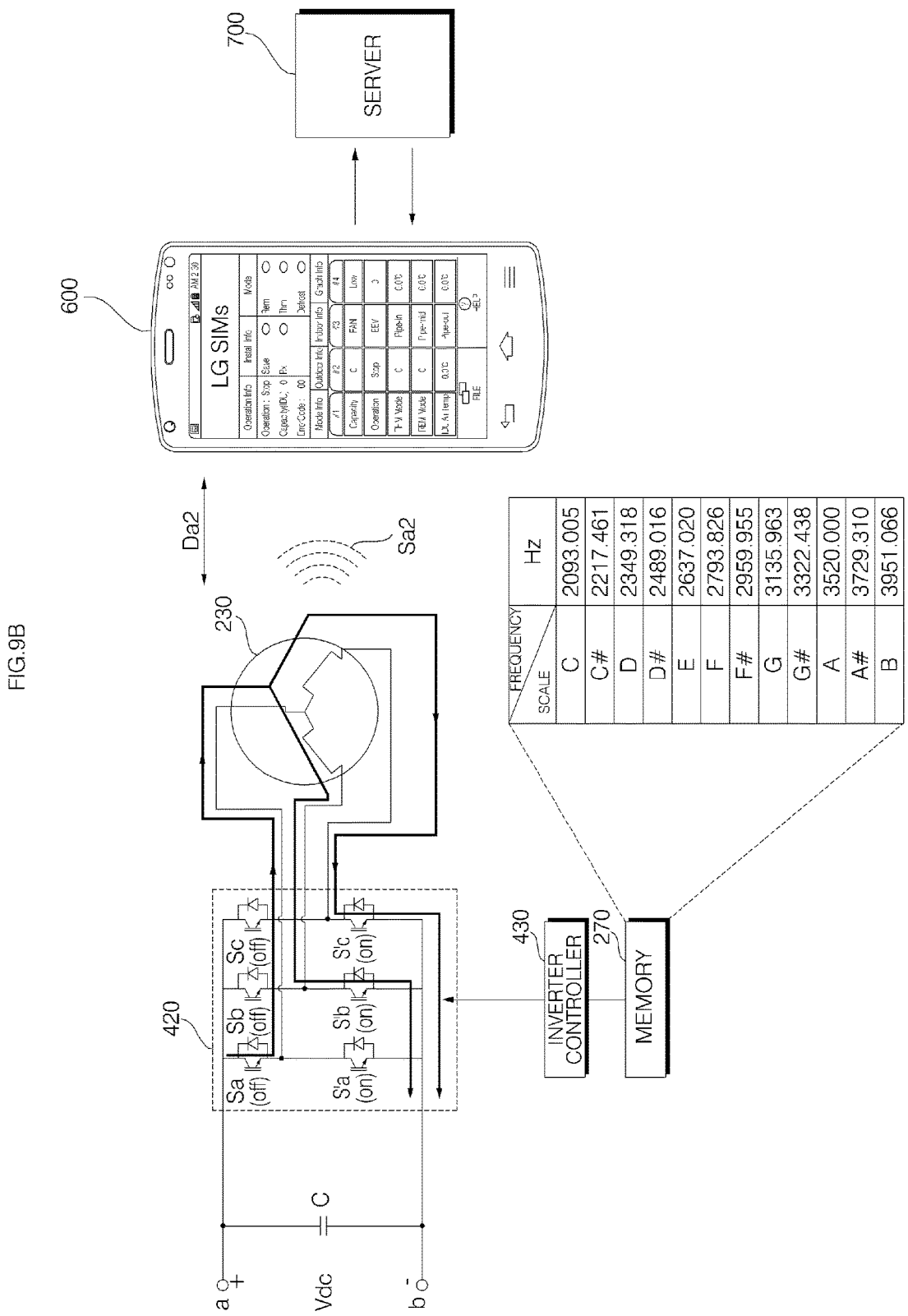

FIG. 9A illustrates a case where motor driving apparatus 220 is at a first distance Da1 from mobile terminal 600, and FIG. 9B illustrates a case where motor driving apparatus 220 is a second distance Da2 from mobile terminal 600.

As shown in the figures, inverter controller 430 may control first sound Sa1 of a first volume to be output when motor driving apparatus 220 is the first distance Da1 from mobile terminal 600, and control second sound Sa2 of a second volume larger than the first volume to be output when motor driving apparatus 220 is at the second distance Da2 greater than the first distance Da1 from mobile terminal 600.

Alternatively, inverter controller 430 may control the first sound Sa1 of a high frequency to be output when motor driving apparatus 220 is the first distance Da1 from mobile terminal 600, and control the second sound Sa2 of a frequency lower than that of the first sound Sa1 to be output when motor driving apparatus 220 is the second distance Da2, which is greater than the first distance Da1, from mobile terminal 600. That is, low frequency sound reaching farther than the high frequency sound may be controlled to be output.

Alternatively, inverter controller 430 may control the first sound Sa1 to be output during a first period if motor driving apparatus 220 is the first distance Da1 from mobile terminal 600, and control the second sound Sa2 to be output during a second period, which is greater than the first period, if motor driving apparatus 220 is the second distance Da2, which is greater than the first distance Da1, from mobile terminal 600.

Alternatively, inverter controller 430 may control the first sound Sa1 corresponding to a first amount of data to be output when motor driving apparatus 220 is the first distance Da1 from mobile terminal 600, and control the second sound Sa2 corresponding to a second amount of data larger than the first amount of data to be output when motor driving apparatus 220 is the second distance Da2, which is longer than the first distance Da1, from mobile terminal 600.

While FIGS. 9A and 9B illustrate that the first upper switching device Sa and the second and third lower switching devices S'b and S'c are turned on, the first lower switching device S'a is turned off, and the second and third upper switching devices Sb and Sc are turned on in order to output sound, various other embodiments are also possible.

The turning on/off of the switching devices for outputting sound illustrated in FIGS. 9A and 9B may be the same as the operation performed in the motor alignment section T1 of FIG. 5.

Inverter controller 430 may change the turn-on duty of a switching control signal for driving the respective switching devices in inverter 420 such that the volume of sound changes. Relevant details will be described with reference to FIGS. 10A and 10B.

Figure 10A:
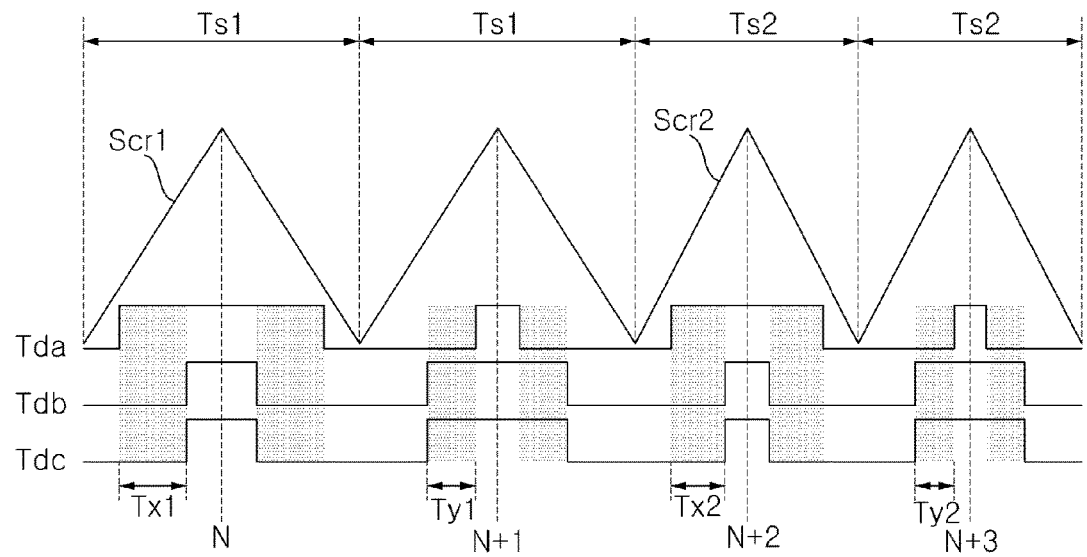
Figure 10B:
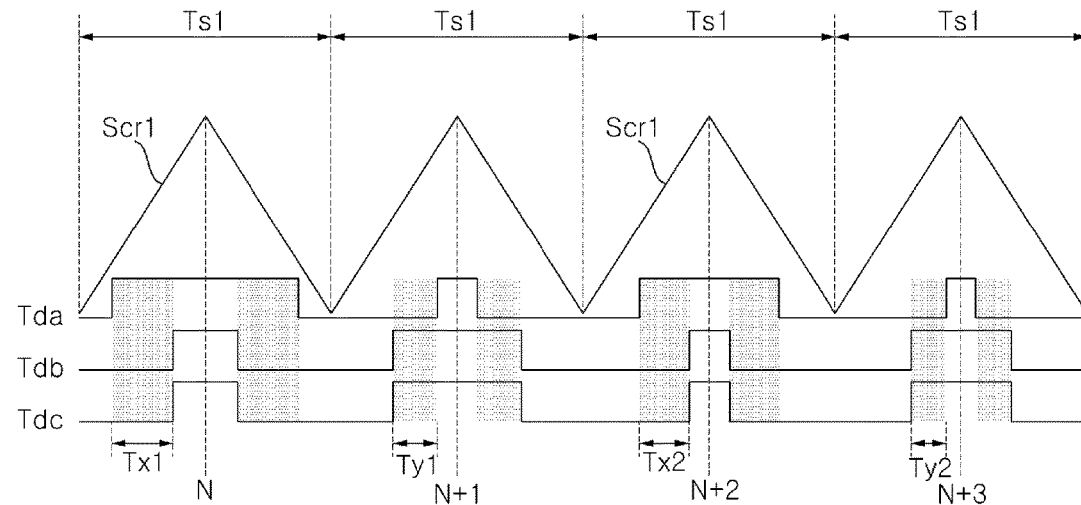

FIGS. 10A and 10B illustrate a method of adjusting the volume of sound.

FIG. 10A illustrates change of the period from Ts1 to Ts2.

In the first Ts1 section, as the difference among an a-phase turn-on duty Tda, a b-phase turn-on duty Tdb and a c-phase turn-on duty Tdc increases, the current flowing through motor 230 may increase, and thus the volume of sound may increase.

In the second Ts1 section, the a-phase turn-on duty decreases, and the b-phase turn-on duty and the c-phase turn-on duty increase. Thereby, the current increased in the first Ts1 section may be reduced.

Next, in the first Ts2 section, the period, namely the switching frequency, changes and the current flowing through motor 230 increases according to the difference among the a-phase turn-on duty Tda, b-phase turn-on duty Tdb, and c-phase turn-on duty Tdc. Thereby, the volume of sound may increase.

In the second Ts2 section, the a-phase turn-on duty decreases, and the b-phase turn-on duty and the c-phase turn-on duty increase. Thereby, the current increased in the first Ts2 section may be reduced.

FIG. 10B illustrates a constant period of Ts1.

In the first Ts1 section, as the difference among an a-phase turn-on duty Tda, a b-phase turn-on duty Tdb, and a c-phase turn-on duty Tdc increases, the current flowing through motor 230 may increase, and thus the volume of sound may increase.

In the second Ts1 section, the a-phase turn-on duty decreases, and the b-phase turn-on duty and the c-phase turn-on duty increase. Thereby, the current increased in the first Ts1 section may be reduced.

Next, in the first Ts1 section, the period, namely the switching frequency changes, and the current flowing through motor 230 increases according to the difference among the a-phase turn-on duty Tda, b-phase turn-on duty Tdb, and c-phase turn-on duty Tdc. Thereby, the sound volume may increase.

In the second Ts1 section, the a-phase turn-on duty decreases, and the b-phase turn-on duty and the c-phase turn-on duty Tdc increase. Thereby, the current increased in the first Ts2 section may be reduced.

When data is matched with various kinds of sound, inverter controller 430 may output corresponding sound as described above.

Alternatively, inverter controller 430 may control sound containing diagnostic data to be output. That is, the sound, which is an acoustic signal, may be used as a carrier, and data may be added to the acoustic signal according to a modulation scheme. Details will be described with reference to FIGS. 11A to 11C.

Figure 11A:
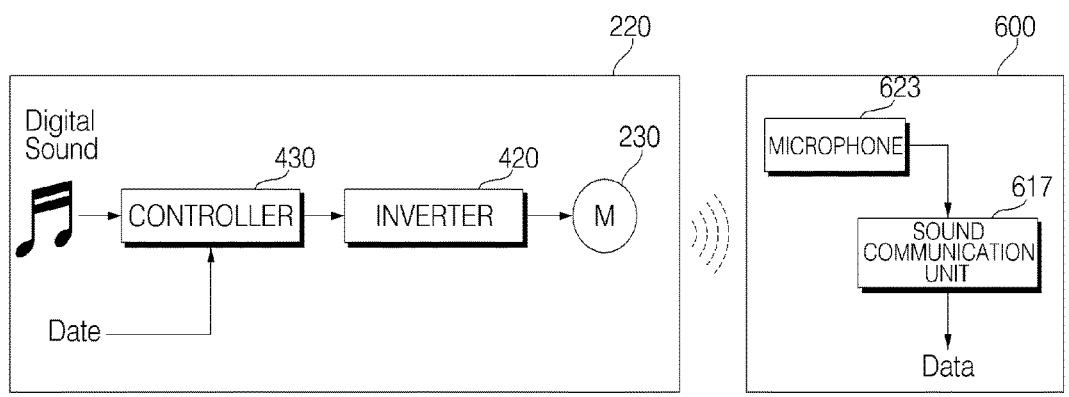
Figure 11B:
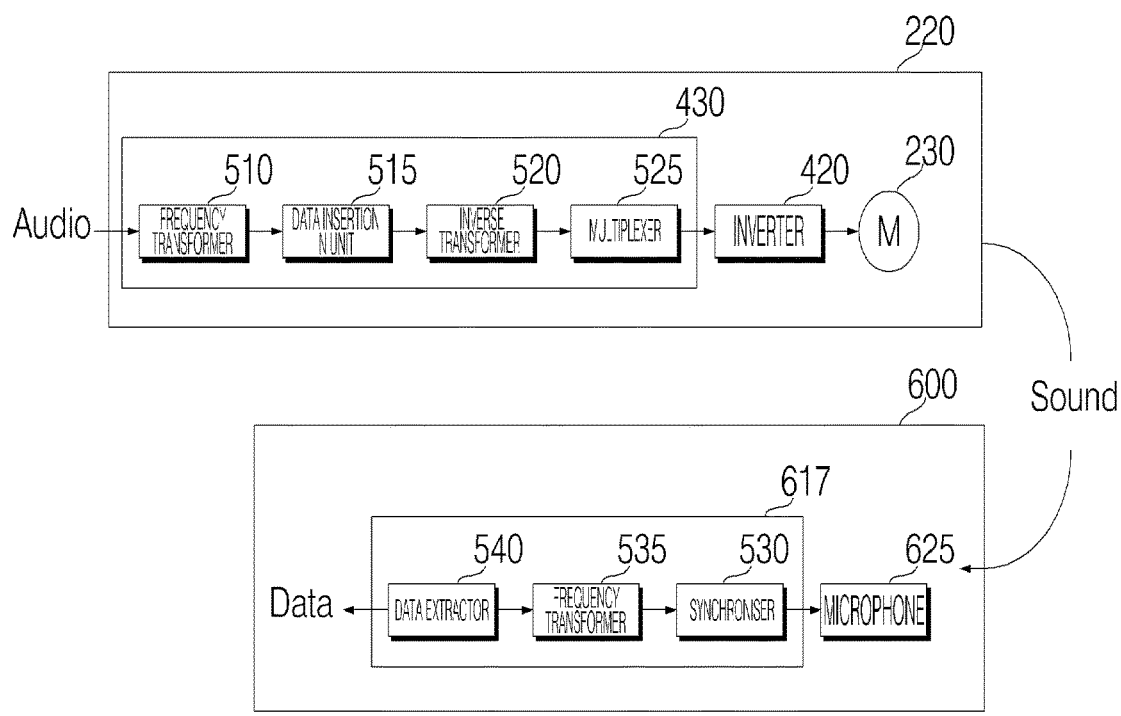
Figure 11C:
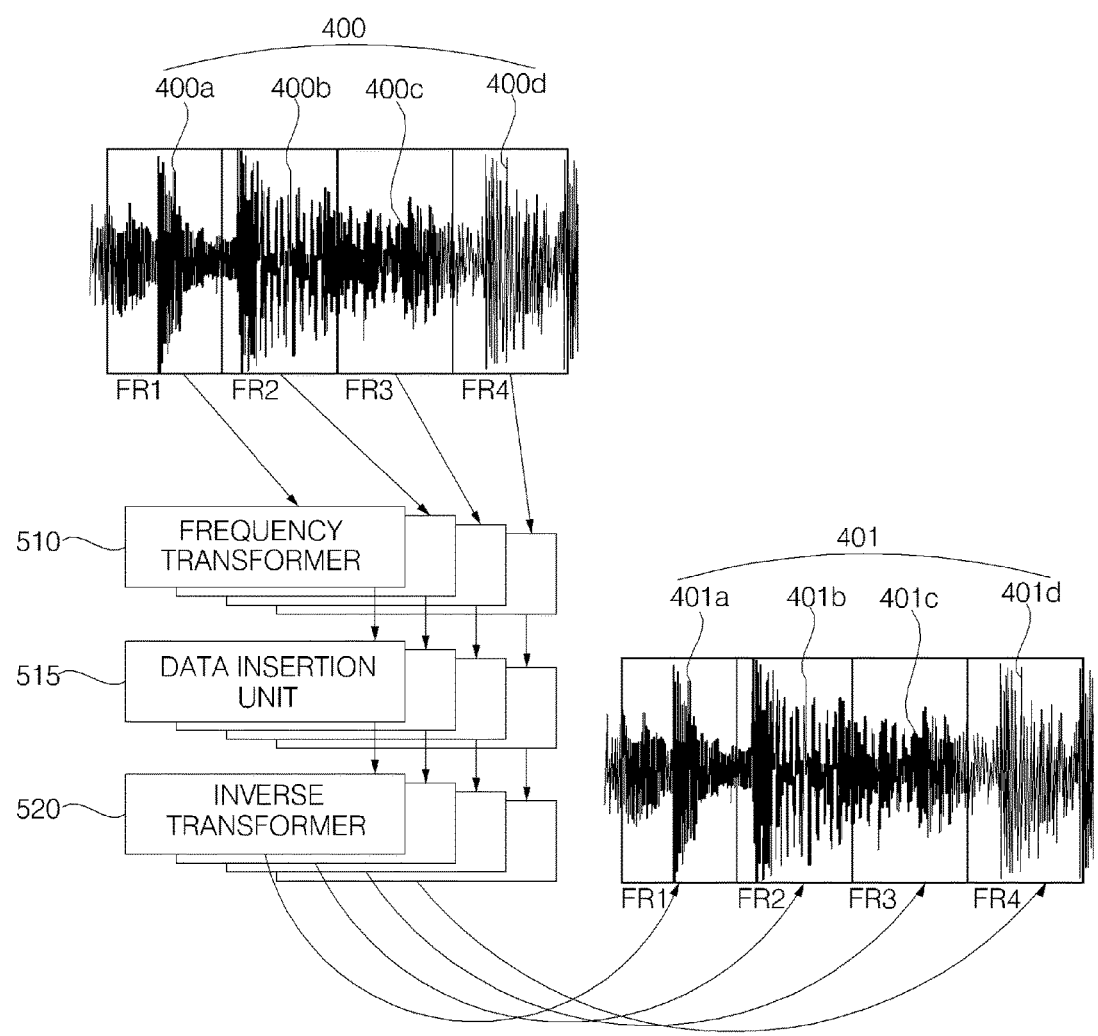

FIGS. 11A to 11C are reference diagrams illustrating sound communication.

FIG. 11A illustrates that motor driving apparatus 220 outputs sound through sound communication, and mobile terminal 600 receives sound.

To this end, motor driving apparatus 220 may include inverter controller 430, inverter 420, and motor 230.

Inverter controller 430 of motor driving apparatus 220 receives an audio signal (digital sound) from, for example, controller 170, and adds predetermined data to the audio signal (digital sound) to be output.

Then, inverter controller 430 changes the switching frequency of inverter 420 to output the audio signal carrying the predetermined data. Thereby, the sound carrying the predetermined data may be output through motor 230.

Microphone 623 of mobile terminal 600 receives the sound output from motor driving apparatus 220. Then, microphone 623 delivers the received sound signal to sound communication unit 617. Sound communication unit 617 extracts the data from the sound.

Thereby, exchange of simple data of information may be implemented between motor driving apparatus 220 and mobile terminal 600.

As a reverse operation to the operation of FIG. 11A, mobile terminal 600 may output sound through sound communication, and motor driving apparatus 220 may receive the sound.

FIG. 11B exemplarily shows an internal block diagram of inverter controller 430 of motor driving apparatus 220 and an internal block diagram of the sound communication unit 617 in mobile terminal 600.

In order to output sound, inverter controller 430 of motor driving apparatus 220 may include a frequency transformer 510, a data insertion unit 515, an inverse transformer 520, and a multiplexer 525.

Frequency transformer 510 may receive an audio signal to be output in the time domain and perform frequency transformation on the audio signal. The frequency transform may be performed on a frame-by-frame basis. Specifically, the frequency transformation may be performed based on modulated complex lapped transform (MCLT).

The MCLT scheme is advantageous in that blocking artifacts at the frame boundary may be reduced according to overlapping of the respective frames.

The data insertion unit 515 adds or inserts predetermined data to or in the frequency-transformed audio signal. That is, data is added to the audio signal according to the modulation scheme. Specifically, of the coefficients (amplitude, phase, and the like) for each frequency having undergone frequency transformation, the phase may be changed to add data. For example, the changed phase may be 0° or 180°. Thereby, the added data may be distinguished.

Inverse transformer 520 performs inverse transform on the audio signal into which data of information has been inserted. If MCLT is performed, frequency transformer 510 performs inverse MCLT to output a sound signal in the time domain.

Frequency transformer 510, data insertion unit 515, and inverse transformer 520 may perform corresponding operations on a frame-by-frame basis.

Multiplexer 525 multiplexes and outputs the audio signal having undergone inverse transform. That is, a plurality of frames is multiplexed.

Then, inverter controller 430 changes the switching frequency of inverter 420. Thereby, multiplexed sound may be output through motor 230.

Mobile terminal 600 receives sound through microphone 623 and transforms the sound into an electrical signal. In order to extract data from the received sound, sound communication unit 617 in mobile terminal 600 may include a synchronizer 530, a frequency transformer 535, and a data extractor 540.

Synchronizer 530 synchronizes received audio signals. That is, synchronizer 530 may synchronize multiplexed audio signals and separate the same on a frame-by-frame basis.

Frequency transformer 535 may receive an audio signal to be output in the time domain and perform frequency transform on the audio signal. The frequency transform may be performed on a frame-by-frame basis. Specifically, the frequency transformation may be performed based on MCLT.

Data extractor 540 extracts data from the frequency-transformed audio signal. As described above, since the data is added to the signal by changing the phase coefficient of the coefficients for respective frequencies, the data may be extracted based on the phase coefficient. In particular, when the phase coefficient is 0° or 180°, the data may be extracted based on this value.

The extracted data may be delivered to controller 670 of mobile terminal 600.

According to MCLT-based sound communication, data may be added to sound similar to an audio signal which is originally intended to be output. In addition, the MCLT scheme is advantageous in that blocking artifacts at the frame boundary may be reduced according to the overlapping of the respective frames.

FIG. 11C illustrates operation of inverter controller 430 of FIG. 11B based on the audio waveform.

Referring to FIG. 11C, an audio signal 400 to be output is exemplarily shown. Audio signal 400 may be divided into a plurality of frames FR1 to FR4. In FIG. 11C, a first audio frame 400a is shown in a first frame FR1, a second audio frame 400b is shown in a second frame FR2, a third audio frame 400c is shown in a third frame FR3, and a fourth audio frame 400d is shown in a fourth frame FR4.

Frequency transformer 510 performs frequency transform on the audio data on a frame-by-frame basis. Specifically, frequency transformer 510 performs frequency transformation according to MCLT.

Then, data insertion unit 515 adds predetermined data to the frequency-transformed audio signal on the frame-by-frame basis. Specifically, of the coefficients (amplitude, phase, and the like) for each frequency having undergone frequency transformation, the phase is changed to add data.

Inverse transformer 520 performs inverse transform on the audio signal carrying the data on a frame-by-frame basis. Thereby, a sound signal is output in the time domain.

In the figure, first to fourth sound signals 401a to 401d similar to first to fourth audio signals 400a to 400d are exemplarily shown in the respective frames. It can be seen from the figure that the first to fourth sound signals 401a to 401d are similar to the audio signals originally intended to be output.

Multiplexer 525 may multiplex sound signals carrying added data on a frame-by-frame basis.

Motor driving apparatus 220 may be employed in various apparatuses. For example, motor driving apparatus 220 may be employed in home appliances such as a laundry treating appliance, an air conditioner, a refrigerator, a water purifier, and a cleaner. Motor driving apparatus 220 may also be applied to, for example, a vehicle, a robot, and a drone which can be driven by the motor.

Figure 12:
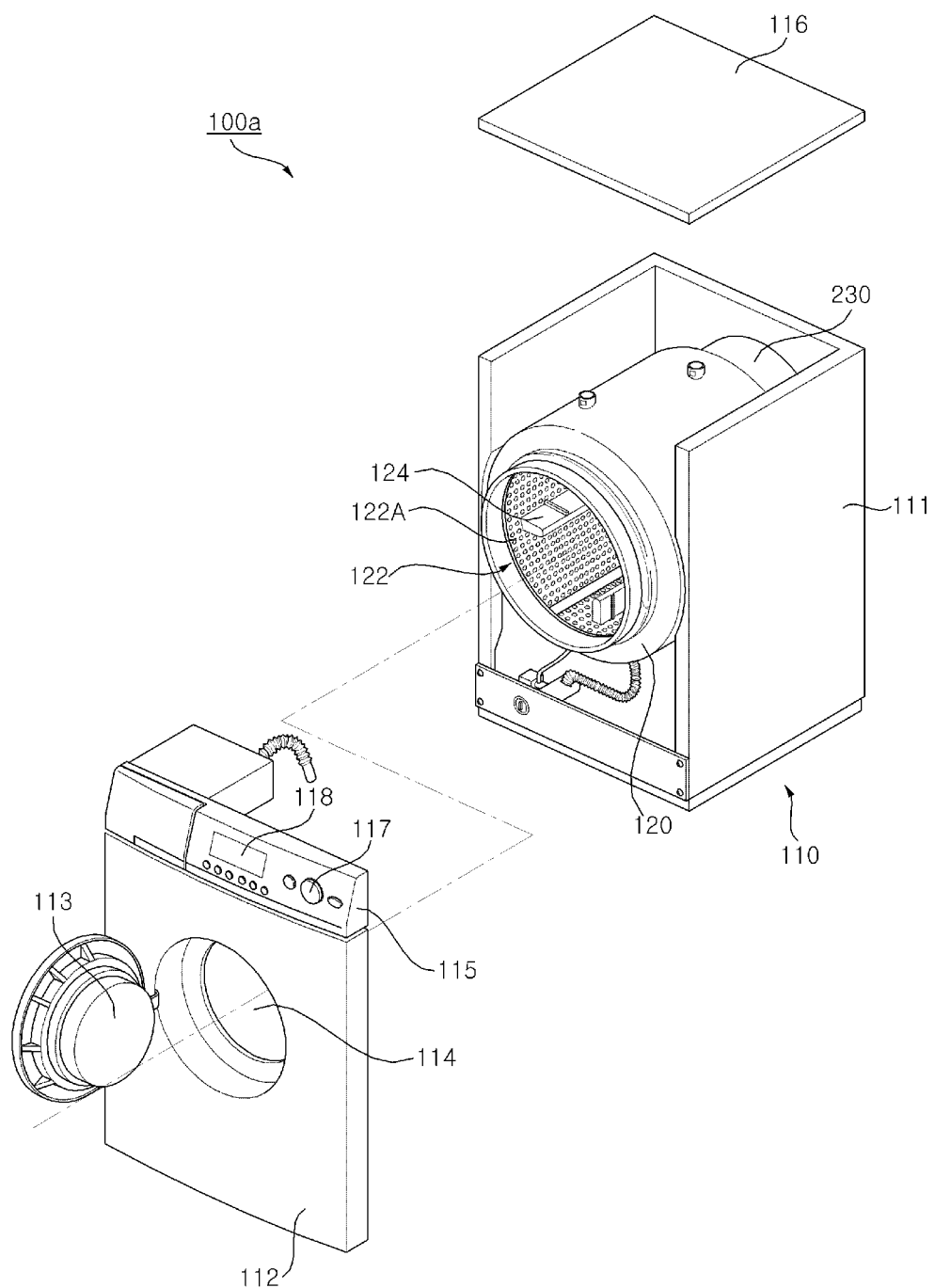
FIG. 12 is a perspective view illustrating a laundry treating appliance which is an exemplary home appliance according to an embodiment of the present invention.

FIG. 12 is a perspective view illustrating a laundry treating appliance according to an embodiment of the present invention.

Referring to FIG. 12, a laundry treating appliance 100a is a front-loading laundry treating appliance wherein laundry is inserted from the front into a washtub. The front-loading laundry treating appliance conceptually includes a washing machine for performing the operations of washing, rinsing, and drying of inserted laundry or a dryer for drying inserted wet laundry. Hereinafter, description will be given focusing on the washing machine.

Laundry treating appliance 100a of FIG. 12, which is a washtub-based laundry treating appliance, includes a cabinet 110 defining the exterior of laundry treating appliance 100a, a tub 120 disposed inside cabinet 110 and supported by cabinet 110, a washtub 122 which is disposed inside tub 120 and in which laundry is washed, a motor 130 for driving washtub 122, and a wash water supplier (not shown) disposed outside a cabinet body 111 to supply wash water into cabinet 110, and a drainage unit (not shown) formed on the lower side of tub 120 to discharge wash water outward.

Washtub 122 is provided with a plurality of through holes 122A allowing wash water to pass therethrough. A lifter 124 may be disposed on the inner surface of washtub 122 to lift the laundry to a certain height during rotation such that the laundry falls due to gravity.

Cabinet 110 includes cabinet body 111, a cabinet cover 112 disposed on and connected to the front surface of cabinet body 111, a control panel 115 disposed on the upper side of cabinet cover 112 and connected to cabinet body 111, and a top plate 116 disposed on the upper side of control panel 115 and connected to cabinet body 111.

Cabinet cover 112 includes a laundry introduction hole 114 formed to allow introduction and retrieval of laundry therethrough and a door 113 disposed to be horizontally rotatable to open and close laundry introduction hole 114.

Control panel 115 includes manipulation keys 117 for controlling the operation status of laundry treating appliance 100a and a display unit 118 disposed on one side of manipulation keys 117 to display the operation state of laundry treating appliance 100a.

Manipulation keys 117 and display unit 118 in control panel 115 are electrically connected to a controller (not shown). The controller (not shown) electrically controls respective constituents of laundry treating appliance 100a. Operation of the controller (not shown) will be described later.

Washtub 122 may be provided with an auto-balancer (not shown). The auto-balancer (not shown), which serves to attenuate vibration caused by maldistribution of laundry contained in washtub 122, may be implemented by, for example, a liquid balancer or a ball balancer.

Although not shown in FIG. 12, laundry treating appliance 100a may further include a vibration sensor for measuring the degree of vibration of washtub 122 or cabinet 110.

Figure 13:
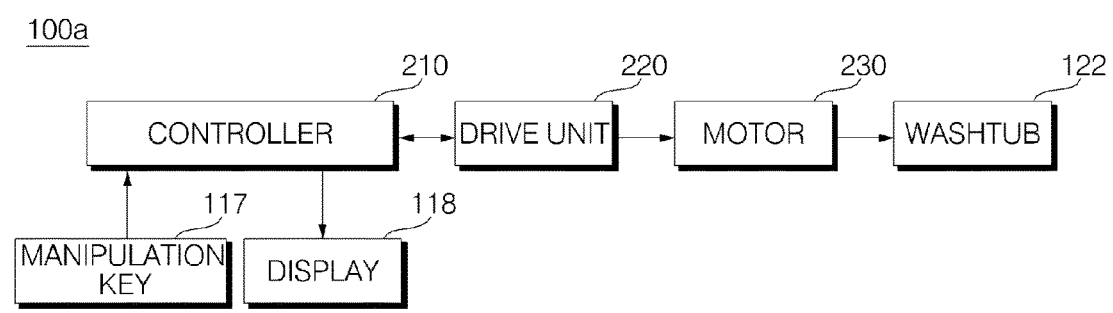
FIG. 13 is an internal block diagram of the laundry treating appliance of FIG. 12.

FIG. 13 is an internal block diagram of the laundry treating appliance of FIG. 12.

Referring to FIG. 13, in laundry treating appliance 100a, drive unit 220 is controlled by a controller 210. Drive unit 220 drives motor 230. Thereby, washtub 122 is rotated by motor 230.

Controller 210 operates according to an operation signal received from manipulation key 117. Thereby, washing, rinsing, and drying may be performed.

Additionally, controller 210 may control display 118 to display a washing mode, a washing time, a drying time, a rinsing time, or the current operation state.

Controller 210 controls drive unit 220 to operate motor 230. In this case, a position sensor for sensing the position of the rotor of motor 230 is not provided to either the interior or the exterior of motor 230. That is, drive unit 220 controls motor 230 in a sensorless manner.

Drive unit 220, which serves to drive motor 230, may include an inverter (not shown), an inverter controller (not shown), an output current detector E (see FIG. 3) for detecting an output current flowing through motor 230, and an output voltage detector F for detecting an output voltage vo applied to motor 230. Drive unit 220 may conceptually further include a converter for supplying DC power to be input to the inverter (not shown).

For example, inverter controller 430 (see FIG. 2) estimates the position of the rotor of motor 230 based on an output current io and the output voltage vo. Then, drive unit 220 controls motor 230 based on the estimated position of the rotor such that motor 230 rotates.

Specifically, when inverter controller 430 (see FIG. 2) generates a PWM switching control signal (Sic of FIG. 2) based on the output current io and the output voltage vo and outputs the same to the inverter (not shown), the inverter (not shown) supplies AC power of a predetermined frequency to motor 230. Then, motor 230 is caused to rotate by the AC power of the predetermined frequency.

Drive unit 220 may correspond to motor driving apparatus 220 of FIG. 1.

Controller 210 may sense the amount of laundry based on, for example, the output current io flowing through motor 230. For example, while washtub 122 is rotating, controller 210 may sense the amount of laundry based on the current value io of motor 230.

Particularly, controller 210 may accurately sense the amount of laundry using the rotor resistance and inductance of the motor measured in a motor alignment interval.

Controller 210 may sense the degree of maldistribution of washtub 122, i.e., unbalance (UB) of washtub 122. Sensing the degree of maldistribution may be performed based on a ripple component of the output current io flowing through motor 230 or change in the rate of rotation of washtub 122.

Particularly, controller 210 may accurately sense the amount of laundry using the rotor resistance and inductance of the motor measured in a motor alignment interval.

Figure 14:
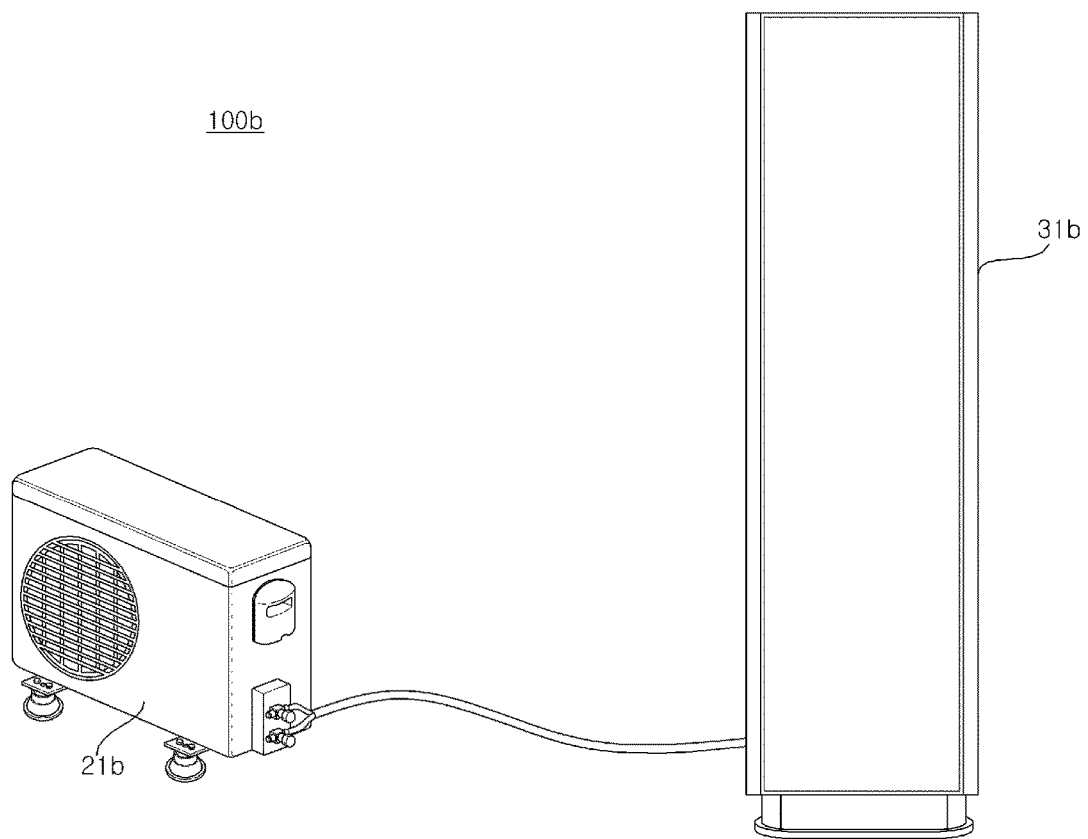
FIG. 14 is a view illustrating configuration of an air conditioner which is another exemplary home appliance according to an embodiment of the present invention.

FIG. 14 is a view illustrating configuration of an air conditioner which is another exemplary home appliance according to an embodiment of the present invention.

According to an embodiment, air conditioner 100b may include an indoor unit 31b and an outdoor unit 21b connected to indoor unit 31b, as shown in FIG. 14.

As indoor unit 31b, any one of a standing indoor unit, a wall-mounted indoor unit, and a ceiling-mounted indoor unit may be employed. In FIG. 14, indoor unit 31b is a standing indoor unit.

Air conditioner 100b may further include at least one of a ventilator, an air cleaner, a humidifier, and a heater, which may operate in connection with operations of the indoor unit and the outdoor unit.

Outdoor unit 21b includes a compressor (not shown) for compressing a refrigerant supplied thereto, an outdoor heat exchanger (not shown) causing heat exchange between the refrigerant and the outdoor air, an accumulator (not shown) for extracting a gaseous refrigerant from the supplied refrigerant and supplying the same to the compressor, and a 4-way valve (not shown) for selecting a flow path of the refrigerant according to the heating operation. Outdoor unit 21b further includes a plurality of sensors, a valve, and an oil collector, which will not be described below.

Outdoor unit 21b operates the compressor and the outdoor heat exchanger provided to outdoor unit 21b to compress the refrigerant or cause heat exchange according to the settings to supply the refrigerant to indoor unit 31b. Outdoor unit 21b may be driven by a remote controller (not shown) or according to a request from indoor unit 31b. As the cooling/heating capacity depends on the indoor unit, the number of operations of the outdoor unit and the number of operations of the compressor installed in the outdoor unit are changeable.

Outdoor unit 21b supplies the compressed refrigerant to indoor unit 31b connected thereto.

Indoor unit 31b receives the refrigerant from outdoor unit 21b and discharges cooled air to the indoor space. Indoor unit 31b includes an indoor heat exchanger (not shown), an indoor unit fan (not shown), an expansion valve (not shown) for expanding the supplied refrigerant, and multiple sensors (not shown).

Outdoor unit 21b and indoor unit 31b are connected through a communication line to exchange data. The outdoor unit and the indoor unit may be connected to a remote control (not shown) by wire or wirelessly. Thereby, operations of the outdoor unit and the indoor unit may be controlled by the remote control (not shown).

The remote control (not shown) is connected to indoor unit 31b to input a control command of the user to the indoor unit. The remote control may receive and display the status information about the indoor unit. The remote control may communicate with the indoor unit by wire or wirelessly.

Figure 15:
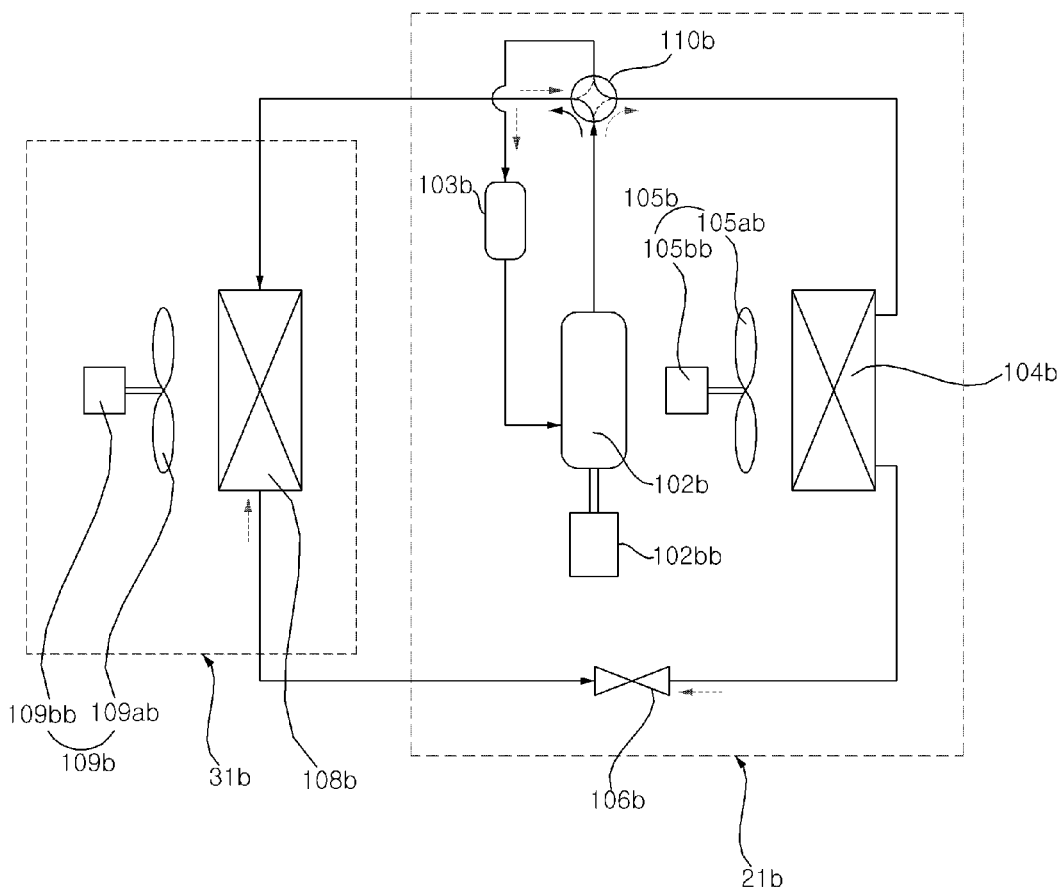
FIG. 15 is a schematic diagram illustrating the outdoor unit and indoor unit of FIG. 14.

FIG. 15 is a schematic diagram illustrating the outdoor unit and the indoor unit of FIG. 14.

Referring to FIG. 15, air conditioner 100b is broadly divided into indoor unit 31b and outdoor unit 21b.

Outdoor unit 21b includes a compressor 102b serving to compress the refrigerant, a compressor motor 102bb for driving the compressor, an outdoor heat exchanger 104b serving to dissipate heat from the compressed refrigerant, an outdoor air blower 105b including an outdoor fan 105ab disposed on one side of the outdoor heat exchanger 104b to support heat dissipation from the refrigerant and a motor 105bb for rotating outdoor fan 105ab, an expansion mechanism 106b for expanding the condensed refrigerant, a cooling/heating switching valve 110b for switching between flow paths of the compressed refrigerant, and an accumulator 103b for temporarily storing the evaporated refrigerant, removing moisture and foreign substances from the stored refrigerant, and then supplying the refrigerant of a constant pressure to accumulator 103b.

Indoor unit 31b includes an indoor heat exchanger 108b disposed in the indoor space to perform the cooling/heating functions and an indoor air blower 109b including an indoor fan 109ab disposed on one side of indoor heat exchanger 108b to support heat dissipation from the refrigerant and a motor 109bb for rotating indoor fan 109ab.

At least one indoor heat exchanger 108b may be installed. As compressor 102b, at least one of an inverter compressor and a constant speed compressor may be employed.

Air conditioner 100b may be configured as an air cooler for cooling the indoor space or as a heat pump for cooling or heating the indoor space.

Compressor 102b in outdoor unit 21b of FIG. 14 may be driven by a motor driving apparatus for driving a compressor motor 250b, such as the motor driving apparatus of FIG. 1.

Alternatively, indoor fan 109ab or outdoor fan 105ab may be driven by a motor driving apparatus for driving an indoor fan motor 109bb or an outdoor fan motor 150bb, such as the motor driving apparatus of FIG. 1.

Figure 16:
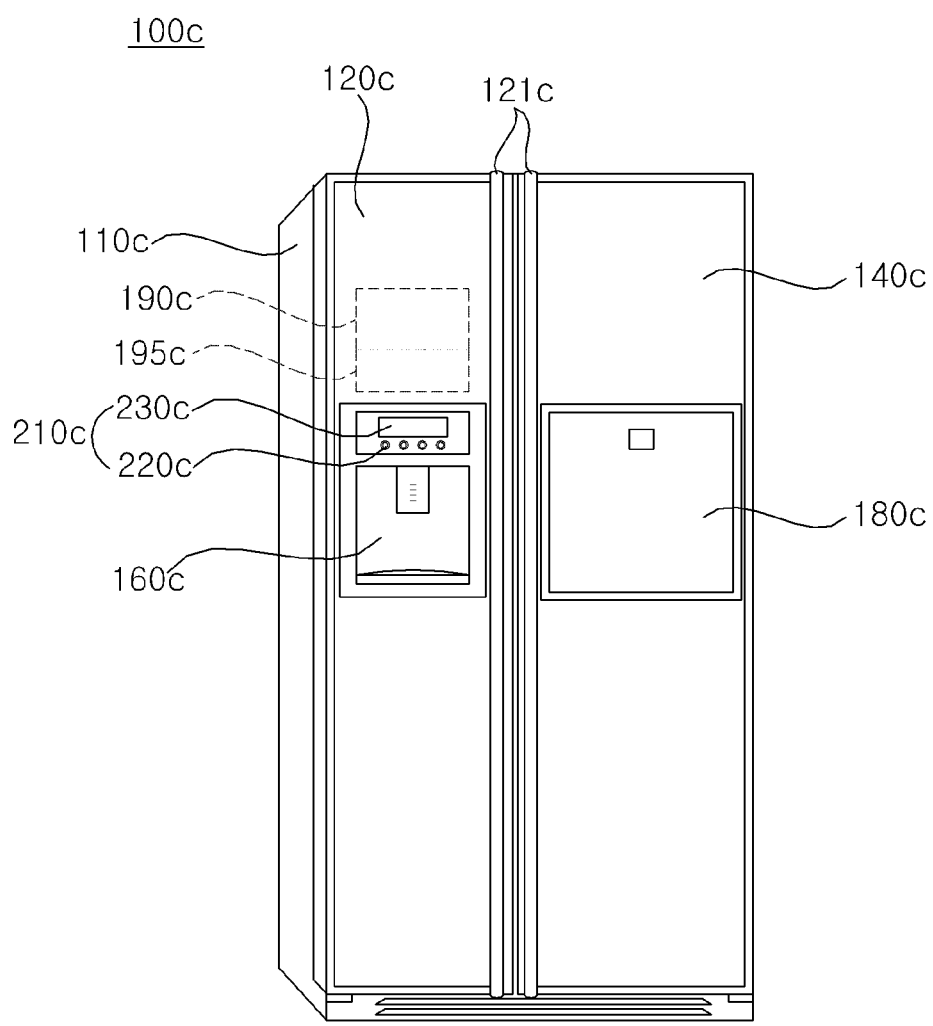
FIG. 16 is a perspective view illustrating a refrigerator which is another exemplary home appliance according to an embodiment of the present invention.

FIG. 16 is a perspective view illustrating a refrigerator which is another exemplary home appliance according to an embodiment of the present invention Referring to FIG. 16, the overall exterior of a refrigerator 100c related to the present invention is defined by a case 110c having an inner space partitioned into a freezer compartment and a cooling compartment, which are not shown, a freezer compartment door 120c for shielding the freezer compartment, and a cooling compartment door 140c for shielding the cooling compartment.

The front surfaces of freezer compartment door 120c and cooling compartment door 140c are provided with door handles 121c protruding forwards such that the user can easily grip door handles 121c to rotate freezer compartment door 120c and cooling compartment door 140c.

The front surface of cooling compartment door 140c may be further provided with a home bar 180c, which is a convenience means allowing the user to take out a stored item such as a beverage without opening cooling compartment door 140c.

The front surface of freezer compartment door 120c may be further provided with a dispenser 160c, which is a convenience means allowing the user to take out ice or drink water without opening freezer compartment door 120c. A control panel 210c for controlling operation of refrigerator 100c and displaying the operation status of refrigerator 100c may be provided on the upper side of dispenser 160c.

While dispenser 160c is illustrated as being disposed on the front surface of freezer compartment door 120c, embodiments of the present invention are not limited thereto. Dispenser 160c may be disposed on the front surface of cooling compartment door 140c.

Meanwhile, the inner upper portion of the freezer compartment (not shown) may be provided with an icemaker 190c for making ice out of the supplied water using cold air in the freezer compartment and an ice bank 195c installed inside the freezer compartment (not shown) to contain separated ice cubes made by the icemaker. Although not shown in the figure, an ice chute (not shown) for guiding ice falling from ice bank 195c into dispenser 160c may be further provided.

Control panel 210c may include an input unit 220c comprising multiple buttons and a display unit 230c for displaying a control window and an operation state.

Display unit 230c displays a control window, an operation state and information such as a temperature in the refrigerator. For example, display unit 230c may display a service mode (ice cubes, water, crushed ice) of the dispenser, a set temperature of the freezer compartment, and a set temperature of the cooling compartment.

Display unit 230c may be implemented as, for example, a liquid crystal display (LCD), light emitting diodes (LEDs), and organic light emitting diodes (OLEDs). Display unit 230c may also be implemented as a touchscreen capable of performing the function of input unit 220c.

Input unit 220c may be provided with multiple manipulation buttons. For example, input unit 220c may include a dispenser setting button (not shown) for setting a service mode (ice cubes, water, chipped ice, etc.) of the dispenser, a freezer compartment temperature setting button (not shown) for setting the temperature of the freezer compartment, a cooling compartment temperature setting button (not shown) for setting the temperature of the cooling compartment. Input unit 220c may be implemented by a touchscreen capable of performing the function of display unit 230c.

The refrigerator according to embodiments of the present invention is not limited to the illustrated double door type refrigerator. The refrigerator may be of any type of refrigerator including one door type, sliding door type, and curtain door type.

Figure 17:
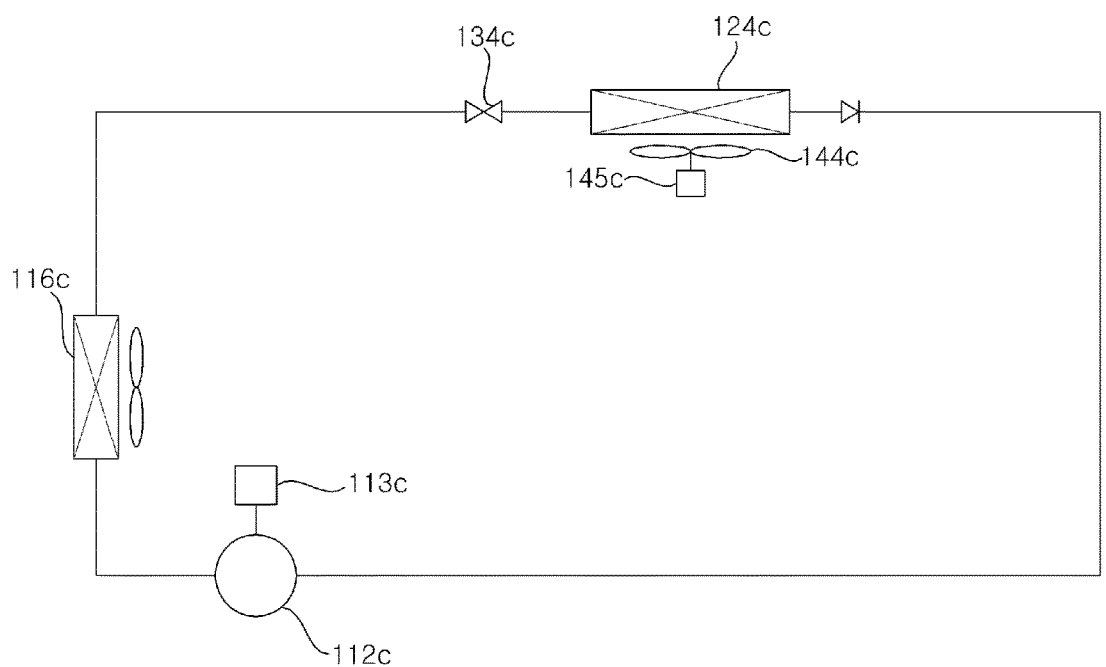
FIG. 17 is a diagram schematically illustrating configuration of the refrigerator of FIG. 16.

FIG. 17 is a diagram schematically illustrating configuration of the refrigerator of FIG. 16.

Referring to FIG. 17, refrigerator 100c may include a compressor 112c, a condenser 116c for condensing a refrigerant compressed by compressor 112c, a freezer compartment evaporator 124c disposed on the freezer compartment (not shown) to evaporate the condensed refrigerant supplied from condenser 116c, and a freezer compartment expansion valve 134c for expanding the refrigerant supplied from freezer compartment evaporator 124c.

While FIG. 17 illustrates that one evaporator is used, each of the cooling compartment and the freezer compartment may employ an evaporator.

That is, refrigerator 100c may further include a cooling compartment evaporator (not shown) disposed on the cooling compartment (not shown), a 3-way valve (not shown) for supplying the refrigerant condensed by condenser 116c to the cooling compartment evaporator (not shown) or freezer compartment evaporator 124c, and a cooling compartment expansion valve (not shown) for expanding the refrigerant supplied to the cooling compartment evaporator (not shown).

Refrigerator 100c may further include a liquid-gas separator (not shown) in which the refrigerant from evaporator 124c is separated into liquid and gas.

Refrigerator 100c may further include a cooling compartment fan (not shown) and a freezer compartment fan 144c, which suction cold air arriving via freezer compartment evaporator 124c and supply the same to the cooling compartment (not shown) and the freezer compartment (not shown).

Refrigerator 100c may further include a compressor drive unit 113c for driving compressor 112c, a cooling compartment drive unit (not shown) for driving the cooling compartment fan (not shown), and a freezer compartment fan drive unit 145c for driving freezer compartment fan 144c.

Referring to FIG. 17, evaporator 124c is used for both the cooling compartment and the freezer compartment. In this case, a damper (not shown) may be installed between the cooling compartment and the freezer compartment, and the fan (not shown) may forcibly blow the air cooled by the evaporator to the freezer compartment and the cooling compartment.

Compressor 112c of FIG. 17 may be driven by a motor driving apparatus for driving the compressor motor, such as the motor driving apparatus of FIG. 1.

Alternatively, the cooling compartment fan (not shown) or freezer compartment fan 144c may be driven by a motor driving apparatus for driving the cooling compartment fan motor (not shown) or the freezer compartment fan motor (not shown), such as the motor driving apparatus of FIG. 1.

A motor driving apparatus, a home appliance including the same, and a mobile terminal according to embodiments of the present invention are not limited to configurations and methods of the embodiments described above. Variations may be made to the embodiments described above by selectively combining all or some of the embodiments.

A motor driving method and a method for operating a home appliance according to the present invention are implementable by processor-readable code on a recording medium which can be read by a processor provided to the motor driving apparatus or home appliance. The recording medium readable by the processor includes all kinds of recording devices for storing data which can be read by the processor.

As is apparent from the above description, the present invention has the following effects.

According to an embodiment of the present invention, a motor driving apparatus and a home appliance including the same include an inverter including a plurality of switching devices and configured to convert DC power into AC power according to the switching operation of the switching devices to supply the AC power to a motor and a controller configured to control the inverter. The controller controls the respective switching devices of the inverter to operate at a constant switching frequency in a first mode which is the motor operation mode, and performs a control operation to change the switching frequency of the switching devices of the inverter in a second mode which is a sound output mode for fault diagnosis to output sound corresponding to the changed switching frequency. Thereby, sound related to fault diagnosis may be easily output using the motor.

In particular, when an error occurs in the first mode, sound corresponding to at least one of the operation information and error information about the motor produced at the time of occurrence of the error is output. Thereby, the operation information or error information may be easily received through a mobile terminal.

According to an embodiment of the present invention, a motor driving apparatus and a home appliance including the same include a memory, a communication unit to receive data from a mobile terminal, an inverter including a plurality of switching devices and configured to convert DC power into AC power according to the switching operation of the switching devices to supply the AC power to a motor, and a controller to control the inverter. When the controller receives a diagnostic data request from the mobile terminal, the controller changes the switching frequency of the respective switching devices of the inverter to output sound corresponding to diagnostic data stored in the memory. Thereby, sound related to fault diagnosis may be easily output using the motor.

In particular, when an error occurs in the first mode, sound corresponding to at least one of the operation information and error information about the motor produced at the time of occurrence of the error is output. Thereby, the operation information or error information may be easily received through the mobile terminal.

According to an embodiment of the present invention, a mobile terminal includes a display, a microphone to receive sound from a home appliance, a communication unit to exchange data with a server, and a controller configured to perform a control operation to send a request for diagnostic data to the home appliance when a diagnostics item is selected with a device diagnosis window displayed, to extract, when sound is received from the home appliance through the microphone in response to the diagnostic data request, diagnostic data from the received sound, and to transmit the extracted diagnostic data to the server. Thereby, the diagnostic data may be easily received through sound output from the home appliance, and the received diagnostic data may be easily transmitted to the server.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A motor driving apparatus comprising:
   an inverter having a plurality of switching devices, wherein the inverter:
   converts a direct current (DC) power into an alternating current (AC) power according to switching of the switching devices; and
   supplies the AC power to a motor; and
   a controller to control the inverter, wherein the controller:
   performs a first control operation such that a switching frequency of the switching devices of the inverter remains constant in a first operation mode of the motor;
   changes the switching frequency of the switching devices of the inverter in a second operation mode corresponding to a sound output mode for fault diagnosis;
   outputs sound corresponding to the changed switching frequency, wherein the sound contains diagnostic data;
   transforms a frequency of the sound into a frequency-transformed audio signal;
   inserts the diagnostic data into the audio signal;
   inversely transforms the audio signal containing the diagnostic data;
   multiplexes the inversely transformed audio signal; and
   further changes the switching frequency of the switching devices of the inverter based on the multiplexed audio signal.

2. The motor driving apparatus of claim 1, further comprising:
   a memory, wherein, when an error occurs during operation in the first operation mode, the controller performs a second control operation to:
   store, in the memory, at least one of motor operation information and error information produced at the time of occurrence of the error;
   enter the second mode according to occurrence of the error; and
   output sound corresponding to at least one of the motor operation information and the error information stored in the memory.

3. The motor driving apparatus of claim 1, wherein the controller performs a second control operation to implement the second operation mode within a predetermined time or prior to an alignment period of the motor after the controller is turned on.

4. The motor driving apparatus of claim 1, further comprising:
   a memory; and
   a communication unit to receive data from a remote controller or a mobile terminal, wherein, when a diagnostic data request is received from the mobile terminal, the controller performs a second control operation to enter the second operation mode and outputs sound corresponding to diagnostic data stored in the memory.

5. The motor driving apparatus of claim 4, wherein the controller changes a volume or frequency of the sound or an output period of the sound according to a distance to the mobile terminal or an intensity of a signal of the diagnostic data request received from the mobile terminal.

6. The motor driving apparatus of claim 1, wherein the controller changes a turn on duty of a switching control signal for driving the switching devices of the inverter such that a volume of the sound changes.

7. The motor driving apparatus of claim 1, wherein the controller performs a control operation to change a level or frequency of a current flowing through the motor to change a volume or frequency of the sound.

8. The motor driving apparatus of claim 1, wherein, when an input for executing the first operation mode is received in the second operation mode, the controller determines whether to stop an operation in the second operation mode, based on a time for completion of the operation in the second operation mode, wherein, when the time for completion of the operation is not later than a predetermined time, the controller performs a control operation to maintain the second operation mode.

9. A motor driving apparatus comprising:
   a memory storing diagnostic data corresponding to sound;
   a communication unit to receive data from a mobile terminal;
   an inverter having a plurality of switching devices, wherein the inverter:

converts a direct current (DC) power into an alternating current (AC) power according to switching of the switching devices; and supplies the AC power to a motor; and a controller to control the inverter, wherein, when a diagnostic data request is received from the mobile terminal, the controller;

changes a switching frequency of the switching devices of the inverter such that the sound corresponding to the diagnostic data stored in the memory is output;

transforms a frequency of the sound into a frequency-transformed audio signal;

inserts the diagnostic data into the audio signal;

inversely transforms the audio signal containing the diagnostic data;

multiplexes the inversely transformed audio signal; and further changes the switching frequency of the switching devices of the inverter based on the multiplexed audio signal.

10. A home appliance comprising:

a motor;

an inverter having a plurality of switching devices, wherein the inverter:

converts a direct current (DC) power into an alternating current (AC) power according to switching of the switching devices; and supplies the AC power to a motor; and a controller to control the inverter, wherein the controller:

performs a first control operation such that a switching frequency of the switching devices of the inverter remains constant in a first operation mode of the motor;

changes the switching frequency of the switching devices of the inverter in a second operation mode corresponding to a sound output mode for fault diagnosis;

outputs sound corresponding to the changed switching frequency, wherein the sound contains diagnostic data;

transforms a frequency of the sound into a frequency-transformed audio signal;

inserts the diagnostic data into the audio signal;

inversely transforms the audio signal containing the diagnostic data;

multiplexes the inversely transformed audio signal; and further changes the switching frequency of the switching devices of the inverter based on the multiplexed audio signal.

11. The home appliance of claim 10, further comprising:

a memory, wherein, when an error occurs during operation in the first operation mode, the controller performs a second control operation to:

store, in the memory, at least one of motor operation information and error information produced at the time of occurrence of the error;

enter the second mode according to occurrence of the error; and output sound corresponding to at least one of the motor operation information and the error information stored in the memory.

12. The home appliance of claim 10, further comprising:

a memory; and a communication unit to receive data from a remote controller or a mobile terminal, wherein, when a diagnostic data request is received from the mobile terminal, the controller performs a second control operation to enter the second operation mode and outputs sound corresponding to diagnostic data stored in the memory.

13. The home appliance of claim 12, wherein, when the home appliance is an air conditioner and a temperature adjustment input is received through the communication unit after the home appliance is turned on, the controller performs a second control operation to implement the second mode before operation of the motor.

14. The home appliance of claim 10, wherein the controller performs a control operation to change a level or frequency of a current flowing through the motor to change a volume or frequency of the sound.

* * * * *